(12) United States Patent
Jaker et al.

(10) Patent No.: US 9,714,318 B2
(45) Date of Patent: Jul. 25, 2017

(54) POLYGLYCOLIC ACID SUPPORT MATERIAL FOR ADDITIVE MANUFACTURING SYSTEMS

(71) Applicant: Stratasys, Inc., Eden Prairie, MN (US)

(72) Inventors: Vittorio L. Jaker, New Brighton, MN (US); James E. Orrock, Eden Prairie, MN (US); Christopher Scott Graley, Glencoe, MN (US)

(73) Assignee: Stratasys, Inc., Eden Prairie, MN (US)

( * ) Notice: Subject to any disclaimer, the term of this patent is extended or adjusted under 35 U.S.C. 154(b) by 494 days.

(21) Appl. No.: 13/951,629

(22) Filed: Jul. 26, 2013

(65) Prior Publication Data

US 2015/0028523 A1    Jan. 29, 2015

(51) Int. Cl.
| | | |
|---|---|---|
| C08G 63/06 | (2006.01) | |
| C08G 63/91 | (2006.01) | |
| C08G 81/00 | (2006.01) | |
| C08K 3/04 | (2006.01) | |
| C08K 3/40 | (2006.01) | |
| B29C 67/00 | (2017.01) | |
| B33Y 10/00 | (2015.01) | |

(52) U.S. Cl.
CPC .......... *C08G 63/06* (2013.01); *B29C 67/0055* (2013.01); *B29C 67/0092* (2013.01); *B33Y 10/00* (2014.12); *C08G 63/912* (2013.01); *C08G 81/00* (2013.01); *C08K 3/04* (2013.01); *C08K 3/40* (2013.01)

(58) Field of Classification Search
CPC ...... C08G 81/00; C08G 63/912; C08G 63/06; C08L 67/04
See application file for complete search history.

(56) References Cited

U.S. PATENT DOCUMENTS

| | | |
|---|---|---|
| 3,421,528 A | 1/1969 | Gomez et al. |
| 3,509,013 A | 4/1970 | Oppenlander |
| 3,974,843 A | 8/1976 | Aubert |
| 4,243,775 A * | 1/1981 | Rosensaft ............ A61L 17/12 525/415 |
| 4,247,508 A | 1/1981 | Housholder |
| 4,397,986 A | 8/1983 | Hornbaker |
| 4,551,369 A | 11/1985 | Belz |
| 4,671,982 A | 6/1987 | Belz |
| 4,863,538 A | 9/1989 | Deckard |
| 4,870,148 A | 9/1989 | Belz et al. |
| 4,886,856 A | 12/1989 | Chen et al. |
| 4,938,816 A | 7/1990 | Beaman et al. |
| 4,944,817 A | 7/1990 | Bourell et al. |
| 5,017,753 A | 5/1991 | Deckard |
| 5,053,090 A | 10/1991 | Beaman et al. |
| 5,076,869 A | 12/1991 | Bourell et al. |
| 5,121,329 A | 6/1992 | Crump |
| 5,132,143 A | 7/1992 | Deckard |
| 5,155,324 A | 10/1992 | Deckard et al. |
| 5,204,055 A | 4/1993 | Sachs et al. |
| 5,296,062 A | 3/1994 | Bourell et al. |
| 5,303,141 A | 4/1994 | Batchelder et al. |
| 5,316,580 A | 5/1994 | Deckard |
| 5,317,043 A | 5/1994 | Gass |
| 5,322,078 A | 6/1994 | Tuttle |
| 5,322,878 A | 6/1994 | Deibig et al. |
| 5,336,755 A | 8/1994 | Pape |
| 5,340,433 A | 8/1994 | Crump |
| 5,342,919 A | 8/1994 | Dickens, Jr. et al. |
| 5,346,955 A | 9/1994 | Sasse et al. |
| 5,378,751 A | 1/1995 | Deibig et al. |
| 5,382,308 A | 1/1995 | Bourell et al. |
| 5,402,351 A | 3/1995 | Batchelder et al. |
| 5,474,719 A | 12/1995 | Fan et al. |
| 5,503,785 A | 4/1996 | Crump et al. |
| 5,527,877 A | 6/1996 | Dickens, Jr. et al. |
| 5,593,531 A | 1/1997 | Penn |
| 5,597,589 A | 1/1997 | Deckard |
| 5,616,294 A | 4/1997 | Deckard |
| 5,639,070 A | 6/1997 | Deckard |
| 5,648,450 A | 7/1997 | Dickens, Jr. et al. |
| 5,653,925 A | 8/1997 | Batchelder |
| 5,695,707 A | 12/1997 | Almquist et al. |
| 5,764,521 A | 6/1998 | Batchelder et al. |
| 5,847,011 A * | 12/1998 | Terado ............... C08G 81/00 521/48 |
| 5,863,885 A | 1/1999 | Ruggieri et al. |
| 5,866,058 A | 2/1999 | Batchelder et al. |

(Continued)

FOREIGN PATENT DOCUMENTS

DE    102009047237    8/2011
EP    0928316    7/1999

(Continued)

OTHER PUBLICATIONS

International Search Report and Written Opinion dated Jun. 3, 2012 from International Application No. PCT/US2011/051735.
www.SolvaySpecialtyPolymers.com, "Selection and Processing Guide", Virantage High-Temperature Tougheners Selection and Processing Guide, Technical Bulletin, available prior to Oct. 31, 2013, 8 pages.

(Continued)

*Primary Examiner* — David Buttner

(74) *Attorney, Agent, or Firm* — Peter J. Ims; Westerman, Champlin & Koehler, P.A.

(57) ABSTRACT

A support material for use in an additive manufacturing system, which compositionally includes a polyglycolic acid polymer, which is at least partially soluble in an aqueous solution, and which is configured for use in the additive manufacturing system for printing a support structure in coordination with printing of a three-dimensional part.

25 Claims, 12 Drawing Sheets

(56) References Cited

U.S. PATENT DOCUMENTS

| | | |
|---|---|---|
| 5,939,008 A | 8/1999 | Comb et al. |
| 5,950,644 A | 9/1999 | Brewer |
| 5,990,268 A | 11/1999 | Dickens, Jr. et al. |
| 6,004,124 A | 12/1999 | Swanson et al. |
| 6,022,207 A | 2/2000 | Dahlin et al. |
| 6,067,480 A | 5/2000 | Stuffle et al. |
| 6,070,107 A | 5/2000 | Lombardi et al. |
| 6,129,872 A | 10/2000 | Jang |
| 6,136,948 A | 10/2000 | Dickens, Jr. et al. |
| 6,165,406 A | 12/2000 | Jang et al. |
| 6,175,422 B1 | 1/2001 | Penn et al. |
| 6,228,923 B1 | 5/2001 | Lombardi et al. |
| 6,245,281 B1 | 6/2001 | Scholten et al. |
| 6,398,495 B1 | 6/2002 | Kazianus |
| 6,476,156 B1 * | 11/2002 | Kim ............... C08G 63/664 525/403 |
| 6,572,807 B1 | 6/2003 | Fong |
| 6,645,412 B2 | 11/2003 | Priedeman, Jr. |
| 6,722,872 B1 | 4/2004 | Swanson et al. |
| 6,790,403 B1 | 9/2004 | Priedeman, Jr. et al. |
| 6,814,907 B1 | 11/2004 | Comb |
| 6,887,640 B2 | 5/2005 | Zhang et al. |
| 6,907,307 B2 | 6/2005 | Chen et al. |
| 6,923,634 B2 | 8/2005 | Swanson et al. |
| 7,077,638 B2 | 7/2006 | Leyden et al. |
| 7,122,246 B2 | 10/2006 | Comb et al. |
| 7,169,882 B2 * | 1/2007 | Mihara ............... C08G 63/60 264/176.1 |
| 7,208,257 B2 | 4/2007 | Cheng et al. |
| 7,236,166 B2 | 6/2007 | Zinniel et al. |
| 7,255,821 B2 | 8/2007 | Priedeman, Jr. et al. |
| 7,384,255 B2 | 6/2008 | LaBossiere et al. |
| 7,604,470 B2 | 10/2009 | LaBossiere et al. |
| 7,625,200 B2 | 12/2009 | Leavitt |
| 7,648,609 B2 | 1/2010 | Leder et al. |
| 7,754,807 B2 | 7/2010 | Priedeman, Jr. et al. |
| 7,794,647 B1 | 9/2010 | Deckard |
| 7,896,209 B2 | 3/2011 | Batchelder et al. |
| 7,938,351 B2 | 5/2011 | Taatjes et al. |
| 7,938,356 B2 | 5/2011 | Taatjes et al. |
| 8,153,182 B2 | 4/2012 | Comb et al. |
| 8,221,669 B2 | 7/2012 | Batchelder et al. |
| 8,221,858 B2 | 7/2012 | Mannella et al. |
| 8,236,227 B2 | 8/2012 | Batchelder et al. |
| 8,246,888 B2 | 8/2012 | Hopkins et al. |
| 8,419,996 B2 | 4/2013 | Swanson et al. |
| 8,459,280 B2 | 6/2013 | Swanson et al. |
| 2003/0090752 A1 | 5/2003 | Rosenberger et al. |
| 2004/0222561 A1 | 11/2004 | Hopkins |
| 2005/0004282 A1 | 1/2005 | Priedeman, Jr. et al. |
| 2005/0103360 A1 | 5/2005 | Tafoya |
| 2005/0129941 A1 | 6/2005 | Comb et al. |
| 2005/0133155 A1 | 6/2005 | Leder et al. |
| 2005/0173838 A1 | 8/2005 | Priedeman, Jr. et al. |
| 2006/0142541 A1 * | 6/2006 | Hossainy ............ A61K 47/482 528/354 |
| 2007/0003656 A1 | 1/2007 | LaBossiere et al. |
| 2007/0123092 A1 | 5/2007 | Legrand |
| 2007/0155906 A1 * | 7/2007 | Hissink ................ A61K 9/1647 525/242 |
| 2007/0228590 A1 | 10/2007 | LaBossiere et al. |
| 2008/0213419 A1 | 9/2008 | Skubic et al. |
| 2009/0035405 A1 | 2/2009 | Leavitt |
| 2009/0054619 A1 * | 2/2009 | Baker ................... C08G 63/823 528/354 |
| 2009/0173443 A1 | 7/2009 | Kozlak et al. |
| 2009/0274540 A1 | 11/2009 | Batchelder et al. |
| 2009/0283119 A1 | 11/2009 | Moussa et al. |
| 2010/0096072 A1 | 4/2010 | Hopkins et al. |
| 2010/0096485 A1 | 4/2010 | Taatjes et al. |
| 2010/0096489 A1 | 4/2010 | Taatjes et al. |
| 2010/0190005 A1 | 7/2010 | Nair et al. |
| 2010/0283172 A1 | 11/2010 | Swanson |
| 2011/0074065 A1 | 3/2011 | Batchelder et al. |
| 2011/0186081 A1 | 8/2011 | Dunn et al. |
| 2011/0233804 A1 | 9/2011 | Batchelder et al. |
| 2012/0070523 A1 | 3/2012 | Swanson et al. |
| 2012/0070619 A1 | 3/2012 | Mikulak et al. |
| 2012/0164256 A1 | 6/2012 | Swanson et al. |
| 2012/0231225 A1 | 9/2012 | Mikulak et al. |
| 2013/0077996 A1 | 3/2013 | Hanson et al. |
| 2013/0077997 A1 | 3/2013 | Hanson et al. |
| 2013/0171434 A1 | 7/2013 | Hirth et al. |

FOREIGN PATENT DOCUMENTS

| | | |
|---|---|---|
| FR | 2854764 | 11/2004 |
| GB | 816016 | 7/1959 |
| WO | 0020215 | 4/2000 |
| WO | 2006022528 | 3/2006 |
| WO | WO-2007/073596 * | 7/2007 |
| WO | 2010018789 | 2/2010 |
| WO | 2010088618 | 8/2010 |
| WO | 2011084995 | 7/2011 |
| WO | 2012/034666 A1 | 3/2012 |

OTHER PUBLICATIONS http://www.plastemart.com/upload/Literature/Polyamide.asp, "Polyamide plays an important role in automotive, electronic and packaging", Oct. 27, 2008, 3 pages.

"Kuredux Polyglycolic Acid (PGA)", Technical Guidebook, Apr. 2011, 12 pages.

* cited by examiner

POLYGLYCOLIC ACID SUPPORT MATERIAL FOR ADDITIVE MANUFACTURING SYSTEMS

BACKGROUND

The present disclosure relates to additive manufacturing systems for printing three-dimensional (3D) parts and support structures. In particular, the present disclosure relates to support materials for use in additive manufacturing systems, consumable assemblies retaining the support materials, methods of using the support materials and assemblies in additive manufacturing systems to print 3D parts.

Additive manufacturing systems are used to print or otherwise build 3D parts from digital representations of the 3D parts (e.g., AMF and STL format files) using one or more additive manufacturing techniques. Examples of commercially available additive manufacturing techniques include extrusion-based techniques, jetting, selective laser sintering, powder/binder jetting, electron-beam melting, and stereolithographic processes. For each of these techniques, the digital representation of the 3D part is initially sliced into multiple horizontal layers. For each sliced layer, a tool path is then generated, which provides instructions for the particular additive manufacturing system to print the given layer.

For example, in an extrusion-based additive manufacturing system, a 3D part may be printed from a digital representation of the 3D part in a layer-by-layer manner by extruding a flowable part material. The part material is extruded through an extrusion tip carried by a print head of the system, and is deposited as a sequence of roads on a platen in an x-y plane. The extruded part material fuses to previously deposited part material, and solidifies upon a drop in temperature. The position of the print head relative to the substrate is then incremented along a z-axis (perpendicular to the x-y plane), and the process is then repeated to form a 3D part resembling the digital representation.

In fabricating 3D parts by depositing layers of a part material, supporting layers or structures are typically built underneath overhanging portions or in cavities of 3D parts under construction, which are not supported by the part material itself. A support structure may be built utilizing the same deposition techniques by which the part material is deposited. The host computer generates additional geometry acting as a support structure for the overhanging or free-space segments of the 3D part being formed, and in some cases, for the sidewalls of the 3D part being formed. The support material adheres to the part material during fabrication, and is removable from the completed 3D part when the printing process is complete.

SUMMARY

An aspect of the present disclosure is directed to a method for printing a 3D part with an additive manufacturing system, such as an extrusion-based additive manufacturing system, a selective laser sintering system, and/or an electrophotography-based additive manufacturing system, for example. The method includes providing a support material comprising a polyglycolic acid (PGA) polymer, where at least a portion of the PGA polymer has monomer units with a structure:

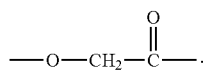

The method also includes providing a part material, printing layers of a support structure from the provided support material, and printing layers of the 3D part from the provided part material in coordination with the printing of the layers of the support structure, where at least a portion the printed layers of the support structure support the printed layers of the 3D part. The method further includes dissolving at least a portion of the support structure from the three-dimensional part with an aqueous solution.

Another aspect of the present disclosure is directed to a support material for use in an additive manufacturing system. The support material compositionally includes a polyglycolic acid (PGA) polymer having at least one extension bonded to the PGA polymer, where the extension includes a linkage group bonded the PGA polymer, and a terminal group bonded to the linkage group, and where the terminal group includes a polymer chain. The support material is configured for use in the additive manufacturing system for printing a support structure from the support material in coordination with printing of a 3D part; and where the composition of the support material is at least partially soluble in an aqueous solution.

Another aspect of the present disclosure is directed to a consumable assembly for use in an additive manufacturing system. The consumable assembly includes a support material having a composition that includes a polyglycolic acid (PGA) polymer, where the composition is at least partially soluble in an aqueous solution, and where the support material is configured for use in the additive manufacturing system for printing a support structure from the support material in coordination with printing of a 3D part. The consumable assembly also includes a container configured to retain at least a portion of the support material and to deliver the support material to the additive manufacturing system.

DEFINITIONS

Unless otherwise specified, the following terms as used herein have the meanings provided below:

The term "polymer" refers to a polymerized molecule having one or more monomer specifies, and includes homopolymers and copolymers. The term "copolymer" refers to a polymer having two or more monomer species, and includes terpolymers (i.e., copolymers having three monomer species).

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the inventive scope of the present disclosure.

Reference to "a" chemical compound refers one or more molecules of the chemical compound, rather than being limited to a single molecule of the chemical compound. Furthermore, the one or more molecules may or may not be identical, so long as they fall under the category of the chemical compound. Thus, for example, "a" polyamide is interpreted to include one or more polymer molecules of the polyamide, where the polymer molecules may or may not be identical (e.g., different molecular weights and/or isomers).

The terms "at least one" and "one or more of" an element are used interchangeably, and have the same meaning that includes a single element and a plurality of the elements, and may also be represented by the suffix "(s)" at the end of the element. For example, "at least one polyamide", "one or more polyamides", and "polyamide(s)" may be used interchangeably and have the same meaning.

Directional orientations such as "above", "below", "top", "bottom", and the like are made with reference to a layer-printing direction of a 3D part. In the embodiments shown below, the layer-printing direction is the upward direction along the vertical z-axis. In these embodiments, the terms "above", "below", "top", "bottom", and the like are based on the vertical z-axis. However, in embodiments in which the layers of 3D parts are printed along a different axis, such as along a horizontal x-axis or y-axis, the terms "above", "below", "top", "bottom", and the like are relative to the given axis.

The term "providing", such as for "providing a consumable material", when recited in the claims, is not intended to require any particular delivery or receipt of the provided item. Rather, the term "providing" is merely used to recite items that will be referred to in subsequent elements of the claim(s), for purposes of clarity and ease of readability.

Unless otherwise specified, temperatures referred to herein are based on atmospheric pressure (i.e. one atmosphere).

The terms "about" and "substantially" are used herein with respect to measurable values and ranges due to expected variations known to those skilled in the art (e.g., limitations and variabilities in measurements).

DETAILED DESCRIPTION

Figure 1:
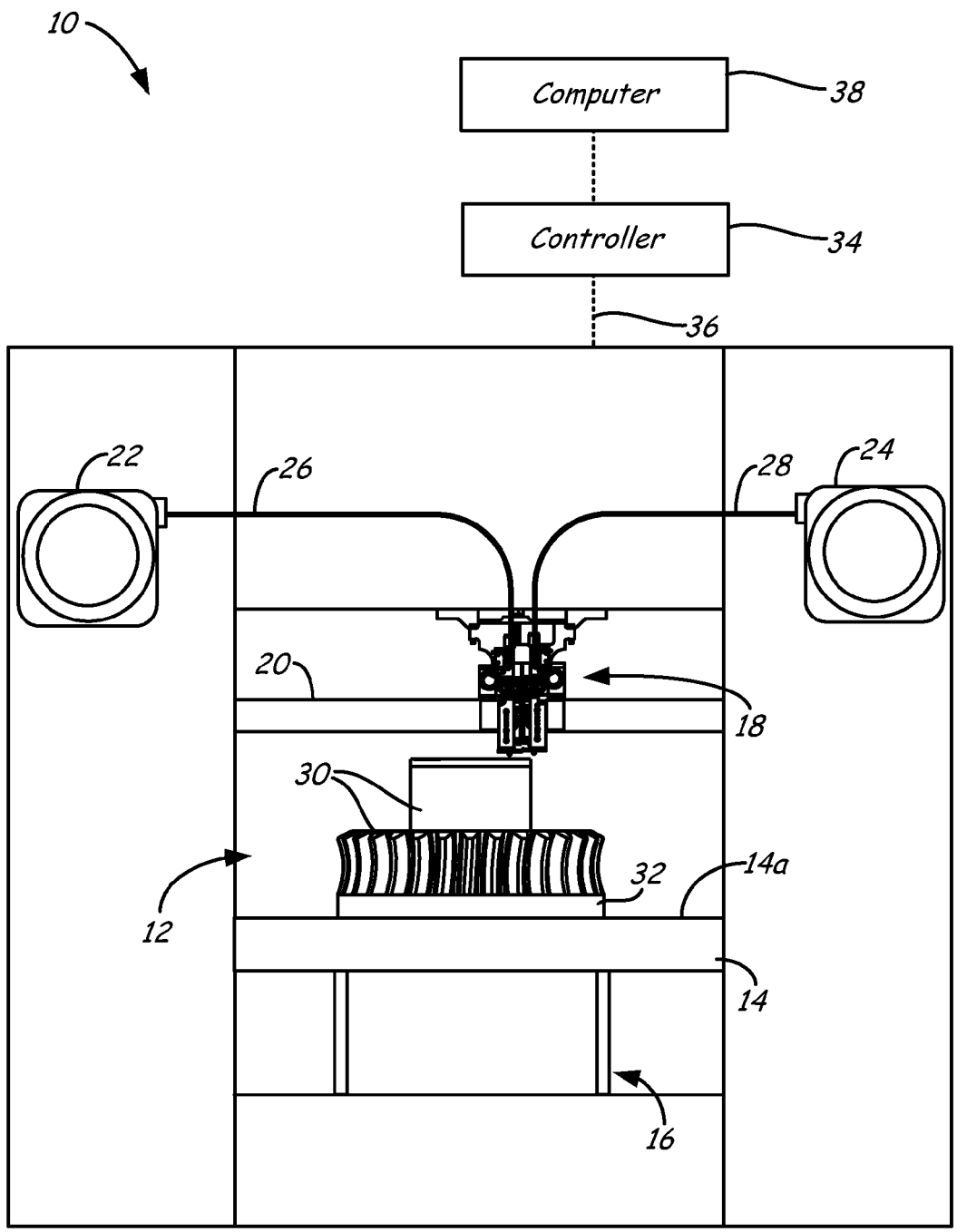
FIG. 1 is a front view of an extrusion-based additive manufacturing system configured to print 3D parts and support structures, where the support structures are printed from a PGA support material of the present disclosure.

The present disclosure is directed to a polyglycolic acid (PGA) support material for printing sacrificial soluble support structures in additive manufacturing systems, such as extrusion-based additive manufacturing systems, selective laser sintering systems, electrophotography-based additive manufacturing systems, and the like. The PGA support material of the present disclosure functions as sacrificial material for an associated part material, and is desirable in cases where overhanging features are required in the final 3D part structure, where significant angular slopes exist in the 3D part, where it is essential to also preserve delicate features in the 3D part, such as small orifices or controlled pore structures, and in some situations, to laterally encase the 3D part.

Once the 3D part has been printed, the support structure of the PGA support material may be removed in a hands-free manner to reveal the completed 3D part, preferably without damaging any of the critical or delicate geometrical features of the 3D part. To accomplish this removal, the PGA support material is at least partially soluble in an aqueous solution, such as an aqueous alkaline solution, allowing the support structure to be dissolved away from the 3D part.

As discussed below, in some preferred embodiments, the PGA support material also exhibits a high heat deflection temperature, allowing it to be printed in association with high-temperature part materials, such as polysulfones, polythersulfones, polyphenylsulfones, polyetherimides, and the like, if desired. In particular, the high heat deflection temperature allows the PGA support material to provide vertical and/or lateral support in the higher operating conditions required for the high-temperature part materials. In comparison, soluble support materials with lower heat deflection temperatures will soften too much under the higher operating conditions, thereby rendering them ineffective as support structure materials.

In comparison, the PGA support material of the present disclosure exhibits a combination of high printing temperatures and aqueous solubility. This combination allows complex 3D parts to be printed from high-performance thermoplastic part materials, while also allowing the associated support structures to be removed in a hands-free manner.

The PGA support material compositionally includes a polyglycolic acid (PGA) polymer, and optionally, one or more additional additives as discussed below. In a first embodiment, the PGA polymer may consist essentially of polyglycolic acid without further modification, such as having the following unbranched structure:

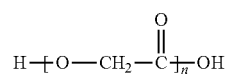

(Formula 1)

where "n" is the number of repeating glycolic acid monomer units, which may vary depending on the desired molecular weight of the polymer. In this embodiment, examples of preferred weight-average molecular weights for the PGA polymer range from about 50,000 to about 150,000, more preferably from about 75,000 to about 125,000, and even more preferably from about 85,000 to about 100,000.

As discussed above, the PGA support material preferably exhibits a high heat deflection temperature, allowing it to be printed in association with high-temperature part materials. The heat deflection temperature of the PGA support material is primarily dependent on the heat deflection temperature of the PGA polymer, where preferred heat deflection temperatures for the PGA polymer in this embodiment include temperatures range from about 150° C. to less than about 220° C., more preferably from about 155° C. to about 200° C., and even more preferably from about 160° C. to about 175° C. As used herein the heat deflection temperature is determined at 1.8 megapascals, pursuant to ASTM D648-07.

While primarily discussed herein for use with high-temperature part materials, the PGA support material may also be used in association with engineering-grade part materials, such as polyamides and polycarbonates, if desired. In these embodiments, the PGA polymer (and the PGA support material itself) may have heat deflection temperatures ranging from about 100° C. to about 150° C.

Furthermore, in embodiments in which material toughness is desired, such as when the PGA support material is produced in filament form, the PGA support material may exhibit a good mechanical strength and modulus. In these embodiments, flexural strengths for the PGA support material (and for the PGA polymer) are preferably greater than about 175 megapascals, and more preferably range from about 180 megapascals to about 200 megapascals, as measured pursuant to ASTM D790-10. Flexural moduli for the PGA support material (and for the PGA polymer) are preferably greater than about 6 gigapascals, and more preferably range from about 7 gigapascals to about 8 gigapascals, as measured pursuant to ASTM D790-10.

This first embodiment, in which the PGA polymer consists essentially of polyglycolic acid without further modification, is particularly suitable for use in a core-shell filament, as discussed further below. For instance, the PGA support material of this embodiment may function as a soluble shell in combination with a bulk core of a second polymer material, such as a material having a lower mechanical strength and modulus, or a second soluble support material having a lower mechanical strength and modulus, but having a higher dissolution rate in the aqueous solution.

In a second embodiment, the polyglycolic-acid chain of the PGA polymer as shown above in Formula 1 may be further modified to incorporate branching and/or terminal extensions. These modifications can increase the molecular weight and branching of the PGA polymer, which is beneficial from a processing standpoint as the unmodified PGA polymer has a relative low viscosity. Increasing the viscosity of the PGA polymer, particularly at low shear rates, is found to be beneficial for extrusion processing in additive manufacturing. For example, the increased viscosity can assist filament production to produce the support material in filament form for use in an extrusion-based additive manufacturing system, as discussed below.

The modifications can also improve the melt strength of the support material during a printing operation in an additive manufacturing system, where the increased melt strength can correspondingly increase the unsupported distance across which the extruded material can bridge without sagging, such as gaps of at least about 0.125 inches, and more preferably at least about 0.25 inches. This improvement in bridging is particularly useful for printing a support structure, since support structures are preferably printed in a partially-hollow manner with internal gaps. The internal gaps reduce the amount of the PGA support material that is required to print a 3D part (i.e., reducing printing duration and material costs), while also increasing the accessible surface area of the resulting support structure for dissolving it in an aqueous solution.

Accordingly, in this second embodiment, one or more monomer units of the PGA polymer may be reacted with a "linking group X" and/or a "branching group Y", each of which in turn may be reacted with a "terminal group Z", such as illustrated by one or more of the following structures:

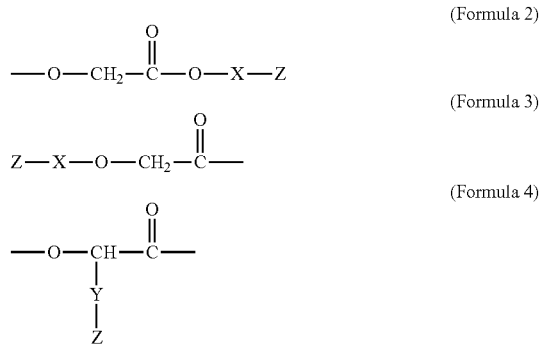

where Formula 2 illustrates a first chain extension (—X—Z), Formula 3 illustrates a second chain extension (—X—Z) that is at the opposing terminal location of the PGA polymer from that shown in Formula 2, and Formula 4 illustrates a branched extension (—Y—Z). Accordingly, each PGA polymer may be modified include one or more of the chain and/or branched extensions shown above in Formulas 2-4.

The following discussion focuses on forming the groups X and Y on the PGA polymer, and then forming the terminal groups Z on the groups X and Y. However, alternatively, the terminal groups Z may initially be formed on the groups X and Y, and the resulting extensions —X—Z and —Y—Z may then be formed on the PGA polymer. In a further alternative embodiment, the terminal groups Z may be formed on the groups X and Y in the same reaction step used to bond the groups X and Y to the PGA polymer.

Linking groups X, shown above in Formulas 2 and 3, are preferably produced from "linking compounds" that may be represented by the following structure:

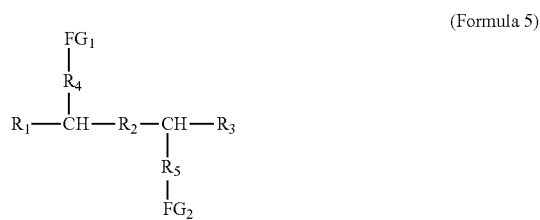

where $FG_1$ is a first functional group capable of reacting with the terminal hydroxyl groups of the PGA polymer, and $FG_2$ is a second functional group capable of reacting with a reciprocating functional group of a terminal group Z.

Groups $R_1$ and $R_2$ may be each independently be any suitable molecular structure, such as a hydrogen atom, a halogen atom, or a hydrocarbon or ether chain having 1-20 carbon atoms. Group $R_3$ may also be a hydrocarbon or ether chain having 1-15 carbon atoms, and more preferably 1-10 carbon atoms. Groups $R_4$ and $R_5$, connected to functional groups $FG_1$ and $FG_2$, may be each independently be a hydrocarbon or ether chain having 1-20 carbon atoms, or a ringed structure that may optionally incorporate the functional group $FG_1$ or $FG_2$.

In alternative embodiments, one or more of groups $R_1$, $R_2$, $R_3$, $R_4$, and $R_5$ may be optionally omitted. For instance, in embodiments in which group $R_4$ and group $R_5$ are omitted, the functional groups $FG_1$ and $FG_2$ may each extend directly from their respective —CH— group of the linking compound shown above in Formula 5. Alternatively (or additionally), in embodiments in which groups $R_1$ and $R_3$ are hydrogen atoms, the linking compound may have a linear structure with terminal functional groups $FG_1$ and $FG_2$.

In some preferred embodiments, one or more of groups $R_1$, $R_2$, and $R_3$ may include additional functional-group chains corresponding to —$R_4$—$FG_1$ and/or —$R_5$—$FG_2$. As such, in these embodiments, the linking compounds may be multi-functional linking compounds having three or more functional groups.

It is also understood that the linking compounds used to form linking groups X in Formulas 2 and 3 are not limited to the exact arrangement illustrated in Formula 5, and may alternatively have different isomers of the structure shown in Formula 5. Furthermore, the linking compounds may alternatively include three or more functional groups, if desired. Examples of preferred weight-average molecular weights for the linking compounds range from about 1,000 to about 40,000, in some embodiments from about 3,000 to about 20,000, and in some further embodiments from about 5,000 to about 10,000.

Preferably, the functional groups $FG_1$ and $FG_2$ are the same type of functional group. For example, the linking compounds may include two or more epoxy-functional groups (e.g., a diepoxide, as shown below in Formula 6), two or more isocyante groups (e.g., a disocyanate, as shown below in Formula 7), two or more anhydride groups (e.g., as shown below in Formula 8), and the like.

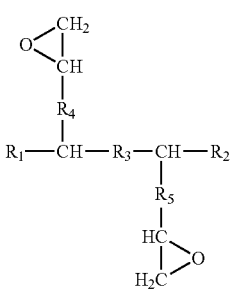

(Formula 6)

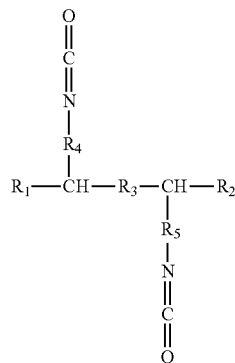

(Formula 7)

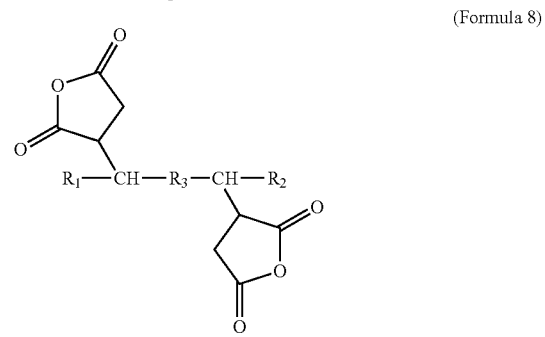

(Formula 8)

In the anhydride embodiment shown by Formula 8, groups $R_4$ and $R_5$ are incorporated into the anhydride functional groups by the shown anhydride ring structure, which can be derived from maleic anhydride. Furthermore, as mentioned above, in some preferred embodiments, the linking compounds shown above in Formulas 6-8 may be multi-functional linking compounds having three or more functional groups, where one or more of groups $R_1$, $R_2$, and $R_3$ may include additional functional-group chains corresponding to —$R_4$—$FG_1$ and/or —$R_5$—$FG_2$.

In alternative embodiments, the functional groups $FG_1$ and $FG_2$ may be different from each other, depending on the particular step-growth reactions with the PGA polymer and the terminal group Z. For example, group $FG_1$ may be an epoxy group (e.g., as illustrated above in Formula 6) and group $FG_2$ may be an anhydride group (e.g., as illustrated above in Formula 8).

The functional group $FG_1$ as an epoxy, isocyanate, or anhydride group, may undergo a step-growth reaction (e.g., a condensation reaction) with either terminal hydroxyl group of the PGA polymer to bond the linking compound to a terminal location of the PGA polymer. This provides the linking group X with a functional group $FG_2$. In some preferred embodiments, the linking compounds are bonded to both terminal locations of the PGA polymer in this manner, thereby providing a linking group X with a functional group $FG_2$ extending from each terminal location of the PGA polymer (i.e., a combination of Formulas 2 and 3).

In some alternative and less-preferred embodiments (due to additional processing steps), one or both of the terminal hydroxyl groups of the PGA polymer may be reacted to incorporate different functional groups (e.g., an amine group ($NH_2$)). In these embodiments, the first functional groups $FG_1$ of the linking compounds are preferably selected to undergo a step-growth reaction with these different functional groups of the PGA polymer.

Next, the functional groups $FG_2$ of the linking groups X may be reacted with reciprocating functional groups of "terminal compounds" used to produce the terminal groups Z, as shown above in Formulas 2 and 3. The terminal compounds may be represented by the following structure:

$FG_3-R_6$ (Formula 9)

where $FG_3$ is the reciprocating functional group configured to react with the —X—$FG_2$ functionality, such as with a step-growth/condensation reaction.

Group $R_6$ may be any suitable molecular structure, such a linear or branched hydrocarbon chain, a linear or branched ether chain, and/or a linear or branched polymer chain. The second terminal location of group $R_6$, opposite of functional group $FG_3$, may include any suitable terminal group, such as a hydrogen atom, a halogen atom, an alkyl group, or another functional group, such as a second group $FG_3$.

Functional group $FG_3$ may be any functional group capable of reacting with the functional group $FG_2$ of the linking group X to bond the terminal compound to the linking group X, thereby providing a structure as shown above in Formulas 2 and/or 3. For example, the functional group $FG_3$ may be a hydroxyl group or an amine group. Preferably, when functional group $FG_2$ is an epoxy group or an isocyanate group, the functional group $FG_3$ is a hydroxyl group. Alternatively, when functional group $FG_2$ is an anhydride group, the functional group $FG_3$ is preferably an amine group.

In one preferred embodiment, the PGA polymer is terminated with hydroxyl groups, the functional groups $FG_1$ and $FG_2$ of the linking compound are each an epoxy group (e.g., as shown above in Formula 6), and the functional group $FG_3$ of the terminal compound is a hydroxyl group. This produces a modified PGA polymer corresponding to Formula 2 having the following structure:

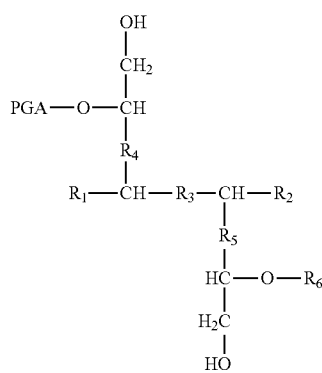

(Formula 10)

where "PGA" in refers to:

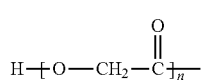

(Formula 11)

In another preferred embodiment, the PGA polymer is terminated with hydroxyl groups, the functional groups $FG_1$ and $FG_2$ of the linking compound are each an anhydride group (e.g., as shown above in Formula 8), and the functional group $FG_3$ of the terminal compound is an anime group. This produces a modified PGA polymer corresponding to Formula 2 having the following structure:

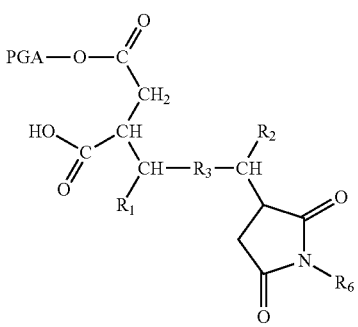

(Formula 12)

Similar structures can be produced for Formula 3, and for a modified PGA polymer that is a combination of Formulas 2 and 3 (i.e., having chain extensions —X—Z bonded to both terminal locations of the PGA polymer). Formulas 2, 3, and 5-12 illustrate example embodiments for chain extensions —X—Z that extend from one or both terminal locations of the PGA polymer. Alternatively (or additionally), the modification to the PGA polymer may occur at one or more branching locations of the PGA polymer, as illustrated above in Formula 4 with a branched extension —Y—Z. These branched extensions —Y—Z are typically formed on non-terminal monomer units of the PGA polymer, although the terminal-monomer units of the PGA polymer may undergo the branching as well depending on the reaction conditions.

Branching group Y, shown above in Formula 4, is typically produced from a "branching compound" that differs from the linking compound discussed above for linking group X. Instead, the branching compound for branching group Y is configured to graft to a monomer unit of the PGA polymer, rather than from a terminal hydroxyl group of the PGA polymer. For example, the branching compound may have a first functional group that is configured to graft to the backbone chain of the PGA polymer (e.g., at the —$CH_2$— carbon atom in a monomer unit), or is polymerizable with the glycolic acid monomers used to polymerize the PGA polymer. The branching compound for branching group Y also includes a second functional group having the same functionality as described above for the functional groups $FG_2$ of the linking compounds, such as an epoxy group, an isocyanate group, an anhydride group, and the like.

Preferably, the branching compound for branching group Y is an ethylenically-unsaturated ringed anhydride, such as maleic anhydride. In this embodiment, the branching compound incorporates an ethylenically-unsaturated group and an anhydride group together into a single ringed structure. The ethylenically-unsaturated group is capable of grafting to a monomer unit along the backbone chain of the PGA polymer, such as with the use of a peroxide curing agent (e.g., 2,5-bis(t-butylperoxy)-2,5-dimethylhexane (DHBP)). This produces a pendant ringed anhydride group, as illustrated by the following structure:

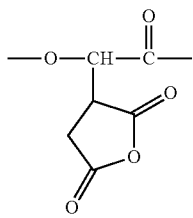

(Formula 13)

As discussed above, the anhydride functional group is preferably used in conjunction with a terminal compound having an amine-functional group $FG_3$. This produces a modified PGA polymer corresponding to Formula 4 having the following structure:

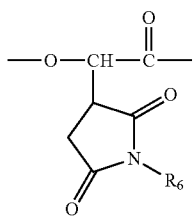

(Formula 14)

Accordingly, the PGA polymer may be modified to include one or more chain extensions (—X—Z), such as shown above in Formulas 2, 3, and 5-12, and/or to include one or more branched extensions (—Y—Z), such as shown above in Formulas 13 and 14. As can be appreciated, the inclusion of these chain and branched extensions increases the molecular weight of the PGA polymer, which is beneficial for extrusion processing during filament production, as well as during printing operations for printing support structures within internal gaps.

Additionally, in a more preferred embodiment, the group $R_6$ of the terminal group Z is derived from a low-molecular weight polymer that is at least partially miscible with the part material. It has been found that the incorporation of miscible molecular groups into the PGA polymer can further compatibilize the PGA polymer to particular part materials, such as increasing adhesive properties to a particular part material and thermal compatibilities. This allows the PGA polymer to be engineered in a manner that increases compatibility with particular part materials.

Suitable weight-average molecular weights for the group $R_6$ may vary depending on the particular polymer selection, and are typically less than about 40,000. In some embodiments, the weight-average molecular weights for the group $R_6$ ranges from about 5,000 to about 35,000, and more preferably from about 10,000 to about 25,000. Furthermore, to maintain good solubility properties in an aqueous solution for a hands-free support structure removal, the extensions —X—Z and —Y—Z may collectively constitute about 20% or less by weight of the modified PGA polymer, and more preferably from about 5% by weight to about 15% by weight, where the backbone chain of the PGA polymer constitutes the remainder of the PGA polymer weight.

The linking groups X and the branching groups Y may collectively from about 0.1% by weight to about 5% by weight of the modified PGA polymer, and more preferably from about 0.2% by weight to about 2.5% by weight. Correspondingly, the terminal groups Z may collectively constitute form about 1% by weight to less than about 20% by weight of the modified PGA polymer, and more preferably from about 5% by weight to about 15% by weight. Again, the backbone chain of the PGA polymer constitutes the remainder of the PGA polymer weight.

Miscibility between the part material and the group $R_6$ of the terminal group Z may be determined based on whether the part material and the terminal compound having group $R_6$ are capable of being mixed as a substantially homogenous blend (i.e., having a substantially singular glass transition temperature). For example, a part material of polyethersulfone (PES), and a group $R_6$ derived from PES or polysulfone (PSU) are capable of being mixed as a substantially homogenous blend. As such, these materials are miscible with each other. Moreover, a part material of polyetherimide (PEI) and a group $R_6$ derived from polyphenylsulfone (PPSU) are capable of being mixed as a substantially homogenous blend. As such, these materials are also miscible with each other.

In a first example, the group $R_6$ of the terminal group Z is derived from a hydroxyl-functional terminal compound of PES, PSU, PPSU, or copopolymers thereof. For example, the PES, PSU, and PPSU compounds may respectively have the following structures:

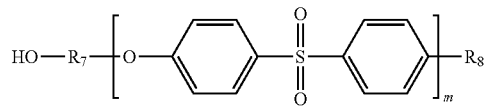

(Formula 15)

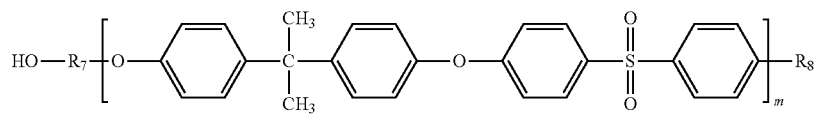

(Formula 16)

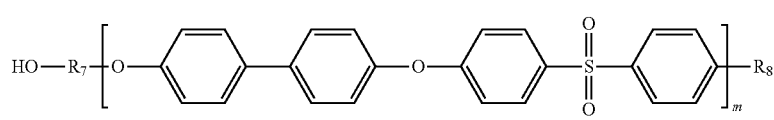

(Formula 17)

where, for each structure, group $R_7$ is an optional group interconnecting the hydroxyl group to the repeating monomer units, and may be any suitable molecular structure, such as a hydrocarbon or ester chain, which may include aliphatic and/or aromatic groups, sulfone groups, and the like. In some embodiments, the group $R_7$ is omitted such that the hydroxyl group is a terminal group of the repeating monomer units.

Furthermore, for each structure, group $R_8$ is a second terminal group for the shown compound, and may include any suitable molecular structure, as discussed above (e.g., a hydrogen atom, a halogen atom, an alkyl group, or another functional group, such as a second hydroxyl group). The integer "m" is the number of repeating monomer units, which may vary depending on the molecular weight of the given terminal compound.

As discussed above, the hydroxyl functional group for each compound is preferably linked to the PGA polymer with a diepoxide linking compound, such as illustrated above in Formulas 6 and 10. For example, a hydroxyl-functional PES terminal compound linked to the PGA polymer in this manner results in the following structure:

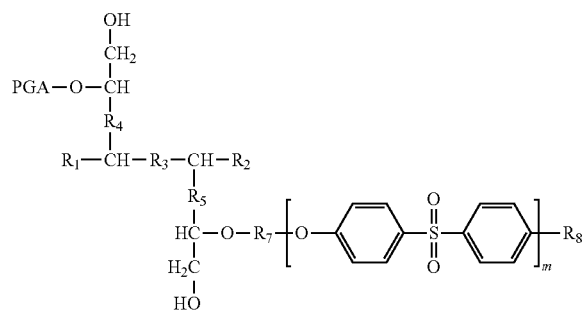

(Formula 18)

The hydroxyl-functional PSU and PPSU terminal compounds are preferably linked to the PGA copolymer with a diepoxide linking compound in the same manner.

In a second example, the group $R_6$ of the terminal group Z is derived from an amine-functional terminal compound derived from PES, PSU, PPSU, or copolymers thereof. For example, the PES, PSU, and PPSU terminal compounds may respectively have the following structures:

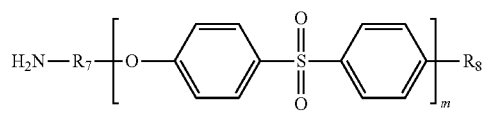

(Formula 19)

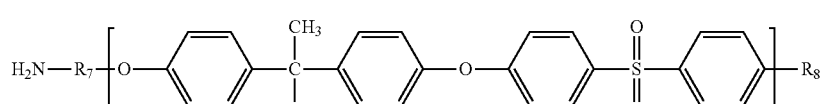

(Formula 20)

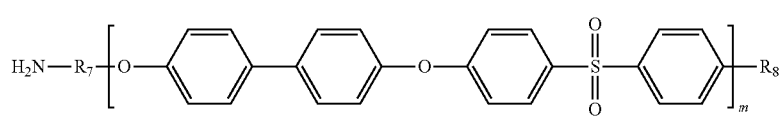

(Formula 21)

where groups $R_7$ and $R_8$ may be the same as discussed above under Formulas 15-17. However, in this example, group $R_7$ is preferably an aromatic group interconnecting the amine group and the monomer units.

As also discussed above, the amine functional group for each terminal compound is preferably linked to the PGA copolymer with an anhydride-functional linking compound, such as illustrated above in Formulas 8 and 12. For example, an amine-functional PES terminal compound linked to the PGA polymer in this manner results in the following structure:

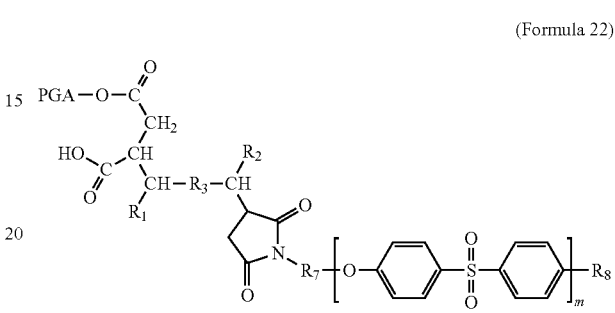

(Formula 22)

The amine-functional PSU and PPSU terminal compounds are preferably linked to the PGA copolymer with an anhydride-functional linking compound in the same manner.

Furthermore, these compounds may be linked as branched groups from non-terminal monomer units, as discussed above under Formulas 4 and 14. For example, an amine-functional PES terminal compound linked to the PGA polymer in this manner results in the following structure:

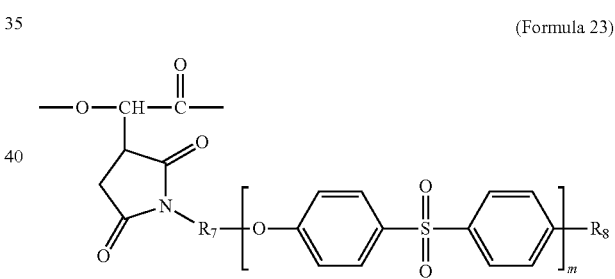

(Formula 23)

As mentioned above, the PGA support material may also be used in association with engineering-grade part materials, such as polyamides and polycarbonates, if desired. For example, the group $R_6$ of the terminal group Z may be derived from an amine-functional terminal compound derived from a nylon-type polyamide. The polyamide terminal compound may have one of the following structures:

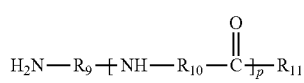
(Formula 24)

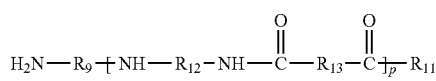
(Formula 25)

where, for each structure, group $R_9$ is an optional group interconnecting the amine group to the repeating monomer units, and may be any suitable molecular structure, such as a hydrocarbon or ester chain, which may include aliphatic and/or aromatic groups, and the like. In some embodiments, the group $R_9$ may be omitted such that the amine group is a terminal group of the repeating monomer units.

Furthermore, for each structure, group $R_{11}$ is a second terminal group for the shown compound, and may include any suitable molecular structure, as discussed above (e.g., a hydrogen atom, a halogen atom, an alkyl group, or another functional group, such as a second amine group). The integer "p" is the number of repeating monomer units, which may vary depending on the molecular weight of the given terminal compound.

Also for each structure, in some embodiments, groups $R_{10}$, $R_{12}$, and $R_{13}$ may each be a hydrocarbon chain having 3-12 carbon atoms. In these embodiments, the hydrocarbon chains for $R_{10}$, $R_{12}$, and $R_{13}$ may be branched (e.g., having small alkyl groups, such as methyl groups) or unbranched, and which are preferably aliphatic, acyclic, saturated hydrocarbon chains.

Alternatively, in other embodiments, groups $R_{10}$, $R_{12}$, and $R_{13}$ may each be a hydrocarbon chain having 5-20 carbon atoms, which may be branched (e.g., having alkyl groups, such as methyl groups) or unbranched, and each of which includes one or more aromatic groups (e.g., benzene groups), one or more cycloaliphatic groups (e.g., cyclohexane groups), or combinations thereof. These latter embodiments may be beneficial in increasing the amorphous properties of the modified PGA polymer, if desired.

The amine functional group for each polyamide terminal compound is preferably linked to the PGA copolymer with an anhydride-functional linking compound, such as illustrated above in Formulas 8 and 12. For example, amine-functional polyamide terminal compounds linked to the PGA polymer in this manner result in the following structures (corresponding to Formulas 24 and 25):

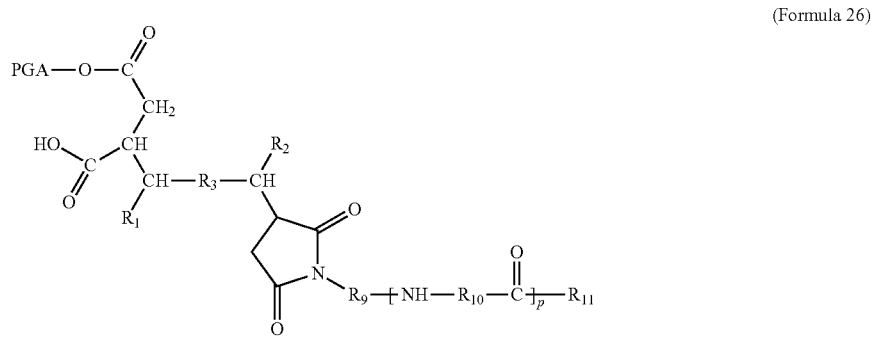
(Formula 26)

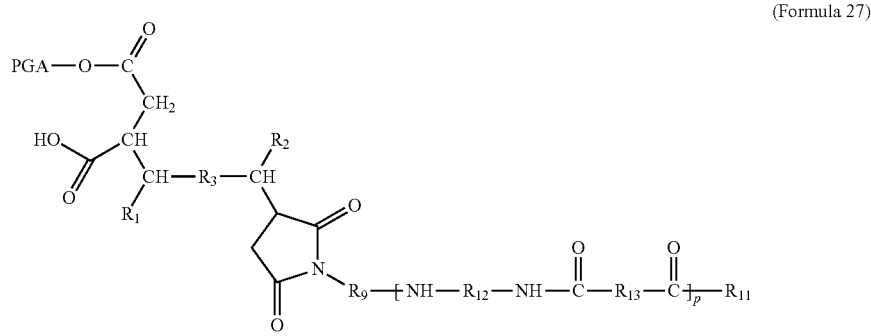
(Formula 27)

Furthermore, these compounds may be linked as branched groups from non-terminal monomer units, as discussed above under Formulas 4 and 14. For example, amine-functional polyamide terminal compounds linked to the PGA polymer in this manner result in the following structures (corresponding to Formulas 24 and 25):

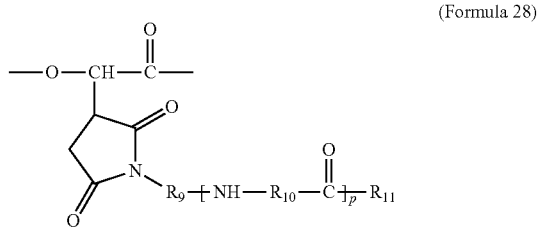
(Formula 28)

(Formula 29)

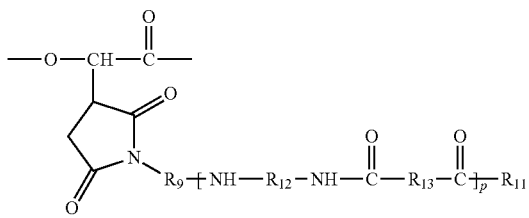

Alternatively, the group $R_6$ of the terminal group Z may be derived from a hydroxyl-functional terminal compound derived from polycarbonate. The polycarbonate terminal compound may have the following structure:

(Formula 30)

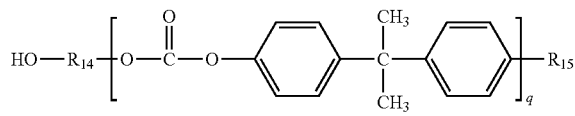

where, for each structure, group $R_{14}$ is an optional group interconnecting the hydroxyl group to the repeating monomer units, and may be any suitable molecular structure, such as a hydrocarbon or ester chain, which may include aliphatic and/or aromatic groups, carbonyl groups, and the like. In some embodiments, the group $R_{14}$ is omitted such that the hydroxyl group is a terminal group of the repeating monomer units (e.g., as a carboxylic acid group).

Furthermore, for each structure, group $R_{15}$ is a second terminal group for the shown compound, and may include any suitable molecular structure, as discussed above (e.g., a hydrogen atom, a halogen atom, an alkyl group, or another functional group, such as a second hydroxyl group). The integer "q" is the number of repeating monomer units, which may vary depending on the molecular weight of the given terminal compound.

As discussed above, the hydroxyl functional group for each compound is preferably linked to the PGA polymer with a diepoxide linking compound, such as illustrated above in Formulas 6 and 10. For example, a hydroxyl-functional polycarbonate terminal compound linked to the PGA polymer in this manner results in the following structure:

Accordingly, the PGA polymer may be modified to include one or more terminal extensions (—X—Z), such as shown above in Formulas 2, 3, 10-12, 18, 22, 26, 27 and 31, and/or to include one or more branched extensions (—Y—Z), such as shown above in Formulas 4, 13, 14, 23, 28, and 29. As mentioned above, it has been found that the incorporation of miscible molecular groups into the PGA polymer can further compatibilize the PGA polymer to particular part materials, such as increasing adhesive properties to a particular part material and thermal compatibilities. This allows the PGA polymer to be engineered in a manner that increases compatibility with particular part materials.

The linking compound(s) and/or branching compound(s), as well as the terminal compound(s) may be reacted to the PGA polymer using a melt blending technique, such as where the materials are reacted in a single or twin-screw extruder operating at a suitable temperature to initiate the reaction, and for a suitable duration. For example, for the above-discussed PSU and PES terminal compounds with a diepoxide linking compound, suitable operating temperatures for the reaction range from about 225° C. to about 300° C., and more preferably from about 240° C. to about 260° C. Suitable durations for the reaction may range from about 5 seconds to about 5 minutes, more preferably from about 10 seconds to 3 minutes, and even more preferably from about 15 seconds to about 1 minute (e.g., about 30 seconds).

For example, in embodiments in which the part material includes PES, PSU, PPSF, PEI, a polyaryletherketone (PAEK), mixtures thereof, filled variations thereof (e.g., carbon and/or glass filled), and the like, the terminal group Z of the PGA polymer preferably includes monomer units of PES, PSU, and/or PPSU (e.g., as shown above in Formulas 15-23), as each of these materials exhibit suitable levels of miscibility with each other. For example, for a part material of a PEI polymer, the terminal group Z of the PGA polymer preferably includes monomer units of PPSU since PPSU is highly miscible with PEI. Examples of suitable part materials in the PAEK family include polyetherketone (PEK), polyetheretherketone (PEEK), polyetherketoneketone (PEKK), polyetheretherketoneketone (PEEKK), polyetherketoneether-ketoneketone (PEKEKK), mixtures thereof, and the like, and more preferably polyetheretherketone (PEEK).

Alternatively, in embodiments in which the part material includes a polyamide, such as those discussed in Mikulak et al., U.S. Publication Nos. 2012/0070619 and 2012/0231225, and in Rodgers, U.S. patent application Ser. No. 13/833,526, the terminal group Z of the PGA polymer preferably includes monomer units of a polyamide (e.g., as shown (Formula 31)

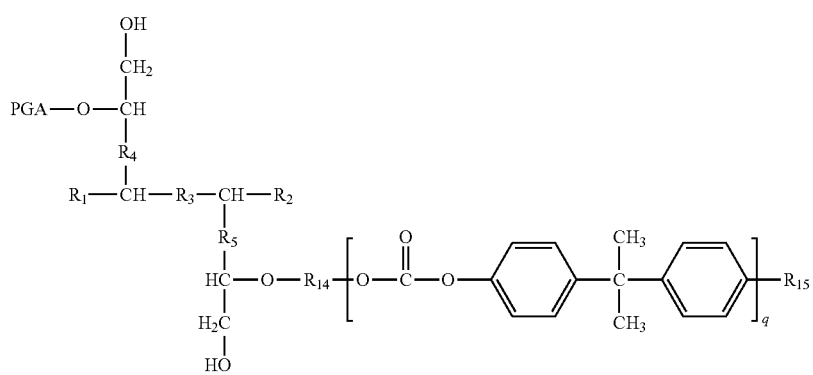

above in Formulas 24-29), as each of these materials exhibit suitable levels of miscibility with each other. Furthermore, in embodiments in which the part material includes a polycarbonate, the terminal group Z of the PGA polymer preferably includes monomer units of a polycarbonate (e.g., as shown above in Formulas 30 and 31), as these materials are miscible with each other.

As mentioned above, the PGA support material may be used to print sacrificial soluble support structures in additive manufacturing systems, such as extrusion-based additive manufacturing systems, electrophotography-based additive manufacturing systems, and selective laser sintering systems. The PGA support material is preferably provided to an additive manufacturing system in a dry state. For example, the PGA support material may be dried prior to being delivered to and used in the additive manufacturing system. As such, in some embodiments, the PGA support material provided to the additive manufacturing system preferably has a moisture concentration less than about 0.1% by weight, and more preferably less than about 0.8% by weight.

Extrusion-Based Additive Manufacturing

In a first embodiment, the PGA support material is configured for use in an extrusion-based additive manufacturing system, such as in a filament form. For example, as shown in FIG. 1, system 10 is an extrusion-based additive manufacturing system for printing or otherwise building 3D parts and support structures using a layer-based, additive manufacturing technique, where the support structures may be printed from the PGA support material. Suitable additive manufacturing systems for system 10 include extrusion-based additive manufacturing systems developed by Stratasys, Inc., Eden Prairie, Minn. under the trademarks "FDM" and "FUSED DEPOSITION MODELING".

In the shown embodiment, system 10 includes chamber 12, platen 14, platen gantry 16, print head 18, head gantry 20, and consumable assemblies 22 and 24. Chamber 12 is an enclosed environment that contains platen 14 for printing 3D parts and support structures. Chamber 12 may be heated (e.g., with circulating heated air) to reduce the rate at which the part and support materials solidify after being extruded and deposited. In some embodiments, suitable heating temperatures for chamber 12, for printing support structures from the PGA support material of the present disclosure, range from about 180° C. to about 210° C., more preferably from about 190° C. to about 200° C.

Alternatively, the heating may be localized rather than in an entire chamber 12. For example, the deposition region may be heated in a localized manner. Suitable techniques for locally-heating a deposition region include heating platen 14 and/or with directing heat air jets towards platen 14 and/or the 3D parts/support structures being printed). The heating anneals the printed layers of the 3D parts (and support structures) to partially relieve the residual stresses, thereby reducing curling of the 3D parts. In alternative embodiments, chamber 12 may be omitted and/or replaced with different types of build environments. For example, a 3D part and support structure may be printed in a build environment that is open to ambient conditions or may be enclosed with alternative structures (e.g., flexible curtains).

Platen 14 is a platform on which 3D parts and support structures are printed in a layer-by-layer manner. In some embodiments, platen 14 may also include a flexible polymeric film or liner on which the 3D parts and support structures are printed. In the shown example, print head 18 is a dual-tip extrusion head configured to receive consumable filaments from consumable assemblies 22 and 24 (e.g., via guide tubes 26 and 28) for printing 3D part 30 and support structure 32 on platen 14.

Consumable assembly 22 may contain a supply of a part material for printing 3D part 30. Correspondingly, consumable assembly 24 may contain a supply of the PGA support material of the present disclosure for printing support structure 32 from the PGA support material.

Platen 14 is supported by platen gantry 16, which is a gantry assembly configured to move platen 14 along (or substantially along) a vertical z-axis. Correspondingly, print head 18 is supported by head gantry 20, which is a gantry assembly configured to move print head 18 in (or substantially in) a horizontal x-y plane above chamber 12.

In an alternative embodiment, platen 14 may be configured to move in the horizontal x-y plane within chamber 12, and print head 18 may be configured to move along the z-axis. Other similar arrangements may also be used such that one or both of platen 14 and print head 18 are moveable relative to each other. Platen 14 and print head 18 may also be oriented along different axes. For example, platen 14 may be oriented vertically and print head 18 may print 3D part 30 and support structure 32 along the x-axis or the y-axis.

System 10 also includes controller 34, which is one or more control circuits configured to monitor and operate the components of system 10. For example, one or more of the control functions performed by controller 34 can be implemented in hardware, software, firmware, and the like, or a combination thereof. Controller 34 may communicate over communication line 36 with chamber 12 (e.g., with a heating unit and/or air blower for chamber 12), platen gantry 16, print head 18, head gantry 20, and various sensors, calibration devices, display devices, and/or user input devices.

While illustrated as a single signal line, communication line 36 may include one or more electrical, optical, and/or wireless signal lines, allowing controller 34 to communicate with various components of system 10. Furthermore, while illustrated outside of system 10, controller 34 and communication line 36 may be internal components to system 10.

System 10 and/or controller 34 may also communicate with one or more computer-based systems, referred to as computer 38, which may include computer-based hardware, such as data storage devices, processors, memory modules and the like for generating, storing, and transmitting tool path and related printing instructions to system 10. Accordingly, computer 38 may also be external and/or internal to system 10. For example, computer 38 may be one or more external computer systems (e.g., desktop, laptop, server-based, cloud-based, tablet, mobile media device, and the like) configured to communicate with system 10 and/or controller 34 over one or more wired and/or wireless communication lines. Alternatively, computer 38 may be internal to system 10, and may communicate with one or more external computer devices.

In some embodiments, controller 34 itself may perform one or more of the operations typically performed by computer 38 or other components of system 10, such as generating and storing tool path and related printing instructions, perform compiler functions, and the like. In further embodiments, controller 34 and computer 38 may be integrated into a common device that performs the operations of both controller 34 and computer 38. It is understood that computer-based calculations, data recording, data generation, data storage, and the like may be performed with the computer-based hardware and software of controller 34 and/or computer 38), such as with one or more processors and computer storage media, as is well known to those skilled in the art.

Figure 2:
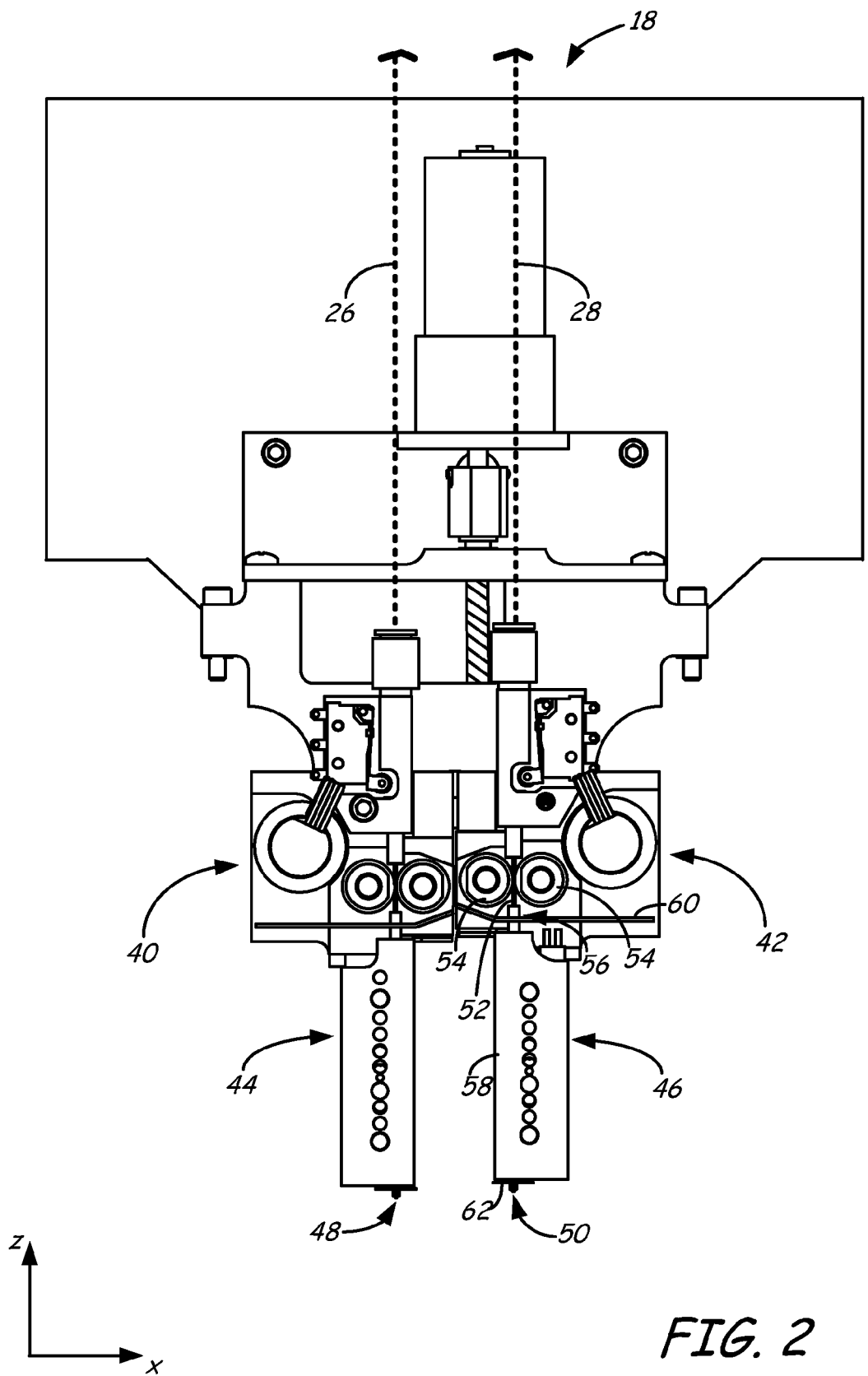
FIG. 2 is a front view of a print head of the extrusion-based additive manufacturing system.

FIG. 2 illustrates a suitable device for print head 18, as described in Leavitt, U.S. Pat. No. 7,625,200. Additional examples of suitable devices for print head 18, and the connections between print head 18 and head gantry 20 include those disclosed in Crump et al., U.S. Pat. No. 5,503,785; Swanson et al., U.S. Pat. No. 6,004,124; LaBossiere, et al., U.S. Pat. Nos. 7,384,255 and 7,604,470; Leavitt, U.S. Pat. No. 7,625,200; Batchelder et al., U.S. Pat. No. 7,896,209; and Comb et al., U.S. Pat. No. 8,153,182. In additional embodiments, in which print head 18 is an interchangeable, single-nozzle print head, examples of suitable devices for each print head 18, and the connections between print head 18 and head gantry 20 include those disclosed in Swanson et al., U.S. Pat. No. 8,419,996.

Figure 3:
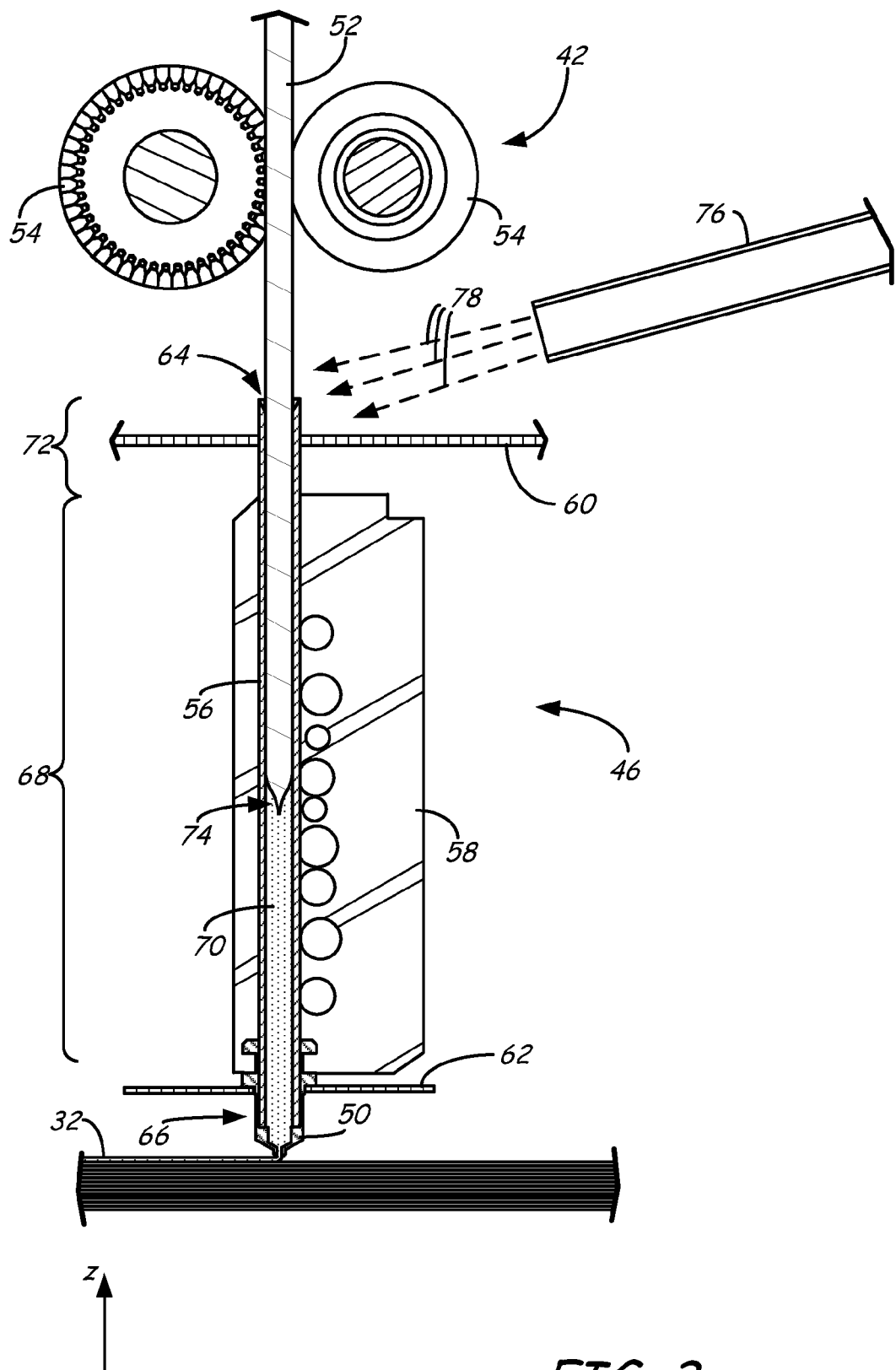
FIG. 3 is an expanded sectional view of a drive mechanism, a liquefier assembly, and a nozzle of the print head for use in the extrusion-based additive manufacturing system.

In the shown dual-tip embodiment, print head 18 includes two drive mechanisms 40 and 42, two liquefier assemblies 44 and 46, and two nozzles 48 and 50, where drive mechanism 40, liquefier assembly 44, and nozzle 48 are for receiving and extruding the part material, and drive mechanism 42, liquefier assembly 46, and nozzle 50 are for receiving and extruding the PGA support material. In this embodiment the part material and the PGA support material each preferably have a filament geometry for use with print head 18. For example, as best shown in FIG. 3, the PGA support material may be provided as filament 52.

During operation, controller 34 may direct wheels 54 of drive mechanism 42 to selectively draw successive segments filament 52 (of the PGA support material) from consumable assembly 24 (via guide tube 28), and feed filament 52 to liquefier assembly 46. Liquefier assembly 46 may include liquefier tube 56, thermal block 58, heat shield 60, and tip shield 62, where liquefier tube 56 includes inlet end 64 for receiving the fed filament 52. Nozzle 50 and tip shield 62 are accordingly secured to outlet end 66 of liquefier tube 56, and liquefier tube 56 extends through thermal block 58 and heat shield 60.

While liquefier assembly 46 is in its active state, thermal block 58 heats liquefier tube 56 to define heating zone 68. The heating of liquefier tube 56 at heating zone 68 melts the support material of filament 52 in liquefier tube 56 to form melt 70. Preferred liquefier temperatures for the PGA support material range from about 300° C. to about 330° C. The upper region of liquefier tube 56 above heating zone 68, referred to as transition zone 72, is not directly heated by thermal block 58. This generates a thermal gradient or profile along the longitudinal length of liquefier tube 56.

The molten portion of the PGA support material (i.e., melt 70) forms meniscus 74 around the unmelted portion of filament 52. During an extrusion of melt 70 through nozzle 50, the downward movement of filament 52 functions as a viscosity pump to extrude the PGA support material of melt 70 out of nozzle 50 as extruded roads to print support structure 32 in a layer-by-layer manner in coordination with the printing of 3D part 30. While thermal block 58 heats liquefier tube 56 at heating zone 68, cooling air may also be blown through a manifold 76 toward inlet end 64 of liquefier tube 56, as depicted by arrows 78. Heat shield 60 assists in directing the air flow toward inlet end 64. The cooling air reduces the temperature of liquefier tube 56 at inlet end 64, which prevents filament 52 from softening or melting at transition zone 72.

In some embodiments, controller 34 may servo or swap liquefier assemblies 44 and 46 between opposing active and stand-by states. For example, while liquefier assembly 46 is servoed to its active state for extruding the PGA support material to print a layer of support structure 32, liquefier assembly 44 is switched to a stand-by state to prevent the part material from being extruded while liquefier assembly 46 is being used. After a given layer of the PGA support material is completed, controller 34 then servoes liquefier assembly 46 to its stand-by state, and switches liquefier assembly 44 to its active state for extruding the part material to print a layer of 3D part 30. This servo process may be repeated for each printed layer until 3D part 30 and support structure 32 are completed.

While liquefier assembly 44 is in its active state for printing 3D part 30 from a part material filament, drive mechanism 40, liquefier assembly 44, and nozzle 48 (each shown in FIG. 2) may operate in the same manner as drive mechanism 42, liquefier assembly 46, and nozzle 50 for extruding the part material. In particular, drive mechanism 40 may draw successive segments of the part material filament from consumable assembly 22 (via guide tube 26), and feed the part material filament to liquefier assembly 44. Liquefier assembly 44 thermally melts the successive segments of the received part material filament such that it becomes a molten part material. The molten part material may then be extruded and deposited from nozzle 48 as a series of roads onto platen 14 for printing 3D part 30 in a layer-by-layer manner in coordination with the printing of support structure 32.

After the print operation is complete, the resulting 3D part 30 and support structure 32 may be removed from chamber 12. Support structure 32 may then be removed from 3D part 30 via dissolution in an aqueous solution, as discussed below.

Figure 4A:
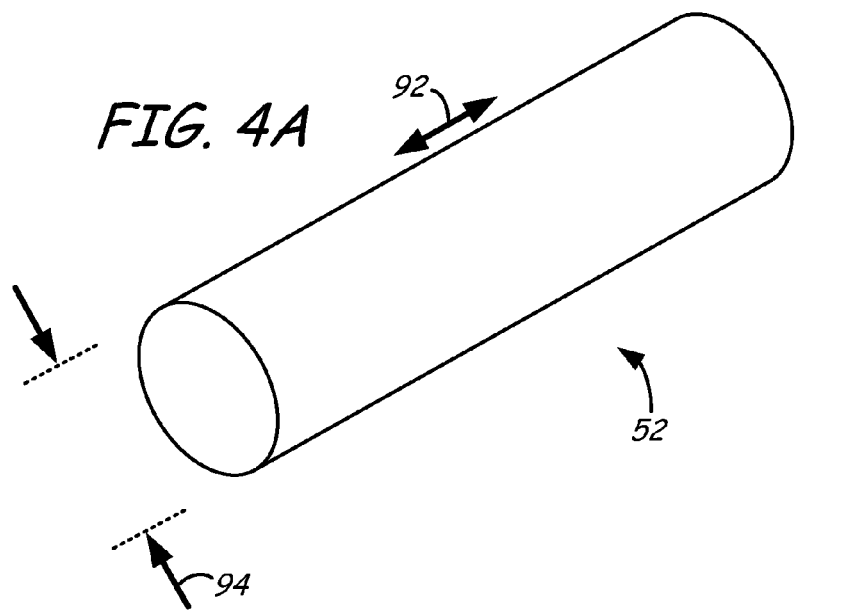
FIG. 4A is a perspective view of a segment of a cylindrical filament of the PGA support material.

FIGS. 4A-4E illustrate example embodiments for filament 52 produced with the PGA support material of the present disclosure. As shown in FIG. 4A, filament 52 may have a cylindrical or substantially cylindrical geometry, such as those disclosed in Crump, U.S. Pat. No. 5,121,329; Crump et al., U.S. Pat. No. 5,503,785; and Comb et al., U.S. Pat. No. 7,122,246. For example, filament 52 may have a longitudinal length 92 and an average diameter (referred to as diameter 94) along longitudinal length 92. Suitable filament dimensions for filament 52 include any dimensions that allow filament 52 to be received by a print head of an additive manufacturing system (e.g., print head 18), such as those disclosed in Rodgers, U.S. patent application Ser. No. 13/833,526, which is incorporated by reference to the extent that it does not conflict with the present disclosure.

Figure 4B:
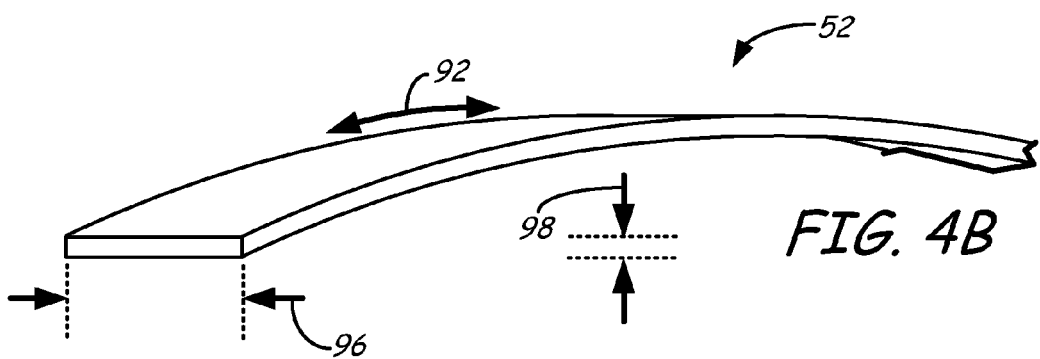
FIG. 4B is a perspective view of a segment of a ribbon filament of the PGA support material.

Alternatively, as shown in FIG. 4B, filament 52 may have a non-cylindrical geometry, such as a ribbon filament as disclosed in Batchelder et al., U.S. Pat. No. 8,221,669. In these embodiments, suitable liquefier assemblies for liquefier assemblies 44 and 46 (shown in FIG. 2) include those disclosed in Batchelder et al., U.S. Application Publication No. 2011/0074065; and in Swanson et al., U.S. Application Publication No. 2012/0070523.

Figure 4C:
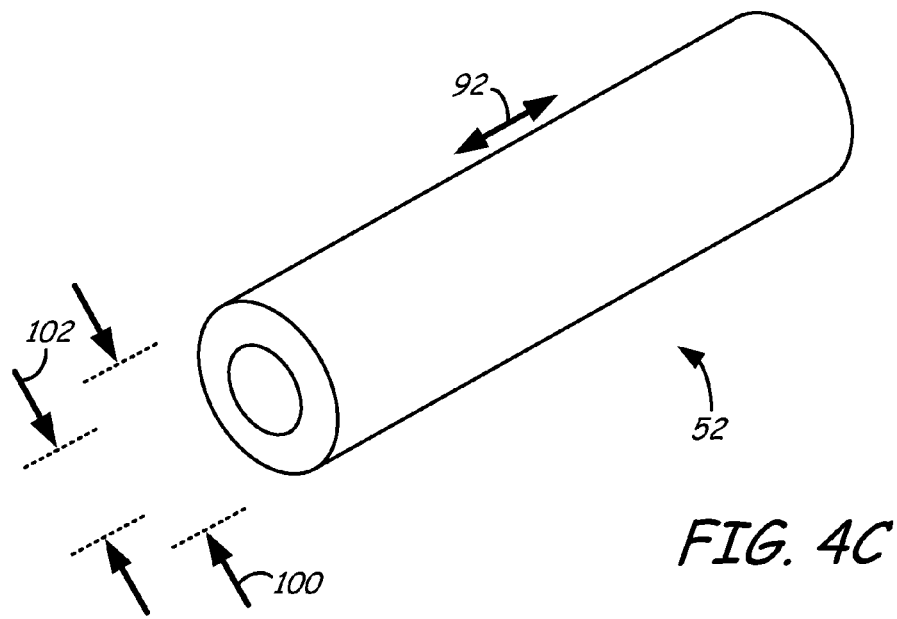
FIG. 4C is a perspective view of a segment of a hollow filament of the PGA support material.

Furthermore, as shown in FIG. 4C, filament 52 may alternatively have a hollow geometry. In this embodiment, filament 52 may have a longitudinal length 92, an average outer diameter (referred to as outer diameter 100) along longitudinal length 92, and an average inner diameter (referred to as inner diameter 102) along longitudinal length 92. Outer diameter 100 and inner diameter 102 may be any suitable dimensions that allows hollow filament 52 to be received by a print head of an additive manufacturing system (e.g., print head 18), such as those disclosed in Rodgers, U.S. patent application Ser. No. 13/833,526.

Figure 4D:
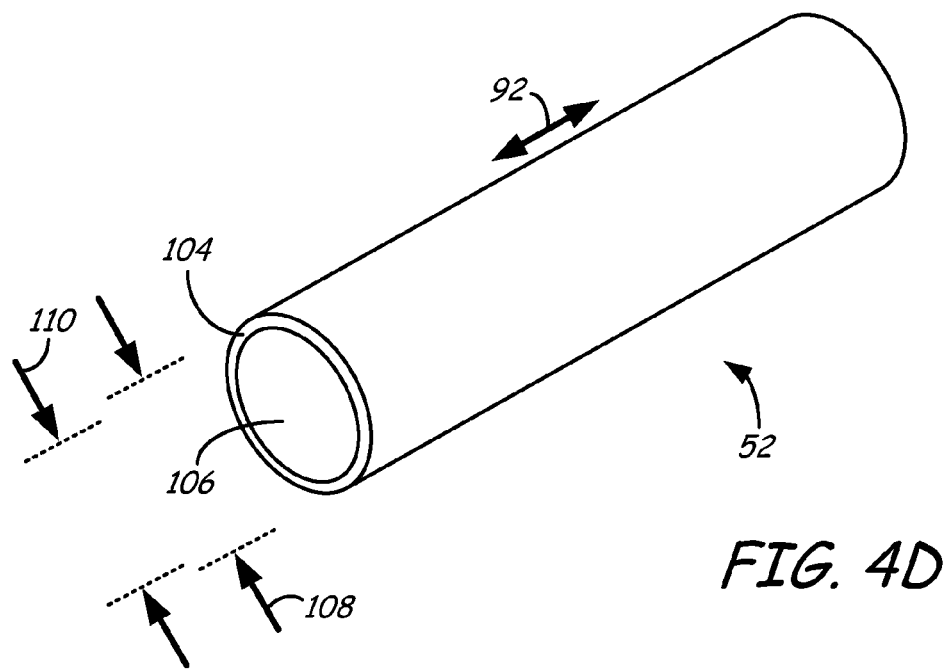
FIG. 4D is a perspective view of a segment of a cylindrical core-shell filament of the PGA support material.
Figure 4E:
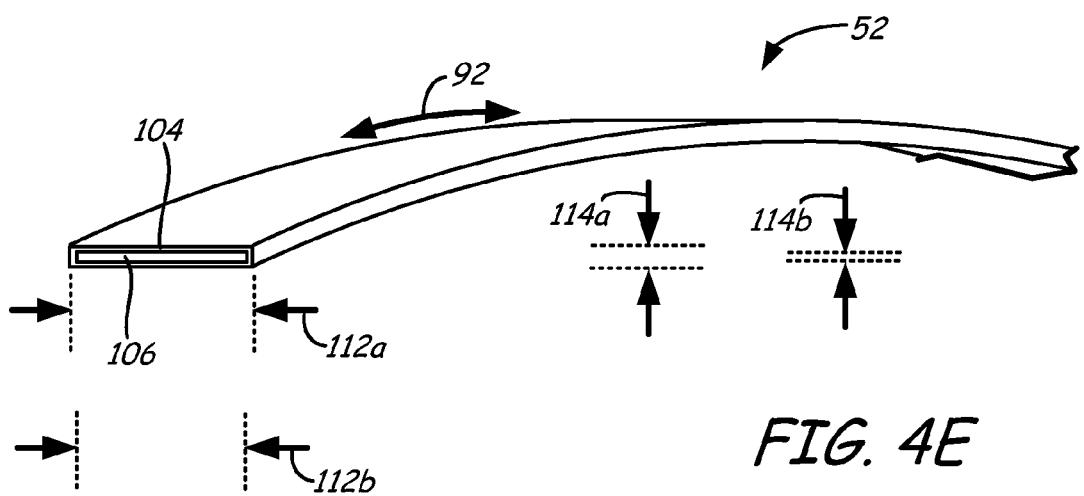
FIG. 4E is a perspective view of a segment of a ribbon core-shell filament of the PGA support material.

Additionally, as shown in FIGS. 4D and 4E, filament 52 may alternatively have a core-shell geometry, as mentioned above, where the PGA support material may be used to form either the core or the shell. For instance, the PGA support material of this embodiment may function as a soluble shell in combination with a bulk core of a second polymer material, such as a second soluble support material having a lower mechanical strength and modulus, but that has a higher dissolution rate in the aqueous solution. Alternatively, the PGA support material may function as a soluble core in combination with a second soluble support material that exhibits exceptional adhesiveness to an associated part material.

In either the cylindrical embodiment shown in FIG. 4D or the ribbon embodiment shown in FIG. 4E, filament 52 may have a longitudinal length 92, a shell portion 104, and a core portion 110, where the shell portion 104 and core portion 110 each preferably extend along longitudinal length 92. In further alternative embodiments, filament 52 may three or more cross-sectional portions (e.g., a core portion and two or more shell portions).

In the cylindrical embodiment shown in FIG. 4D, shell portion 104 has an average outer diameter (referred to as outer diameter 108) along longitudinal length 92, and an average inner diameter (referred to as inner diameter 110) along longitudinal length 92, where inner diameter 110 corresponds to an outer diameter of core portion 106. It is understood that, in some embodiments, the interface between shell portion 104 and core portion 106 may be gradual, where the materials of shell portion 104 and core portion 106 may be blended together along a gradient. Examples of suitable core-shell geometries for this embodiment (e.g., outer diameter 108 and inner diameter 110) include those discussed in Mikulak et al., U.S. Publication Nos. 2012/0070619 and 2012/0231225, the disclosures of which are incorporated by reference to the extent that they do not conflict with the present disclosure.

Alternatively, in the ribbon embodiment shown in FIG. 4E, which is a combination of the embodiments shown above in FIGS. 4B and 4D, shell portion 104 may have an average outer width (referred to as outer width 112a) and an average inner width (referred to as inner width 112b) along longitudinal length 92, where inner width 112b corresponds to an outer width of core portion 106. Similarly, shell portion 104 may have an average outer thickness (referred to as outer thickness 114a) and an average inner thickness (referred to as inner thickness 114b) along longitudinal length 92, where inner thickness 114b corresponds to an outer thickness of core portion 106. Examples of suitable core-shell geometries for this embodiment (e.g., widths 112a and 112b, and thicknesses 114a and 114b) include those discussed in Mikulak et al., U.S. Publication Nos. 2012/0070619 and 2012/0231225, and those discussed above for the ribbon filament 52 in FIG. 4B.

Consumable assembly 24 may include any suitable length of filament 52 as illustrated in FIGS. 4A-4E. Thus, longitudinal length 92 for filament 52 in the embodiments shown in FIGS. 4A-4E is preferably about 100 feet or more. In additional embodiments, filament 52 (e.g., as shown in FIGS. 4A-4E) may include topographical surfaces patterns (e.g., tracks) as disclosed in Batchelder et al., U.S. Pat. No. 8,236,227; and/or may include encoded markings as disclosed in Batchelder et al., U.S. Application Publication No. 2011/0233804.

As mentioned above, in some embodiments, the PGA support material may also include additives in addition to the PGA polymer. In embodiments in which the PGA support material is produced as a filament for use in an extrusion-based additive manufacturing system (e.g., filament 52 in system 10), the additional additives may include as colorants, fillers, plasticizers, and combinations thereof.

For example, in embodiments that include colorants, preferred concentrations of the colorants in the PGA support material range from about 0.1% to about 5% by weight. Suitable colorants include titanium dioxide, barium sulfate, carbon black, and iron oxide, and may also include organic dyes and pigments.

In embodiments that include fillers, preferred concentrations of the fillers in the PGA support material range from about 1% to about 25% by weight. Suitable fillers include calcium carbonate, magnesium carbonate, glass spheres, graphite, carbon black, carbon fiber, glass fiber, talc, wollastonite, mica, alumina, silica, kaolin, silicon carbide, zirconium tungstate, soluble salts, and combinations thereof.

In embodiments that include plasticizers, preferred concentrations of the plasticizers in the PGA support material range from about 0.01% to about 10% by weight. Suitable additional plasticizers for use in the support material include dialkyl phthalates, cycloalkyl phthalates, benzyl and aryl phthalates, alkoxy phthalates, alkyl/aryl phosphates, polyglycol esters, adipate esters, citrate esters, esters of glycerin, and combinations thereof.

In the embodiments including the above-discussed additional additives, the PGA polymer preferably constitutes the remainder of the PGA support material. As such, the PGA polymer may constitute from about 55% to 100% by weight of the PGA support material, and more preferably from about 75% to 100% by weight. In some embodiments, the PGA polymer constitutes from about 90% to 100% by weight of the PGA support material, more preferably from about 95% to 100% by weight. In further embodiments, the PGA support material consists essentially of the PGA polymer, and optionally, one or more colorants.

Figure 5A:
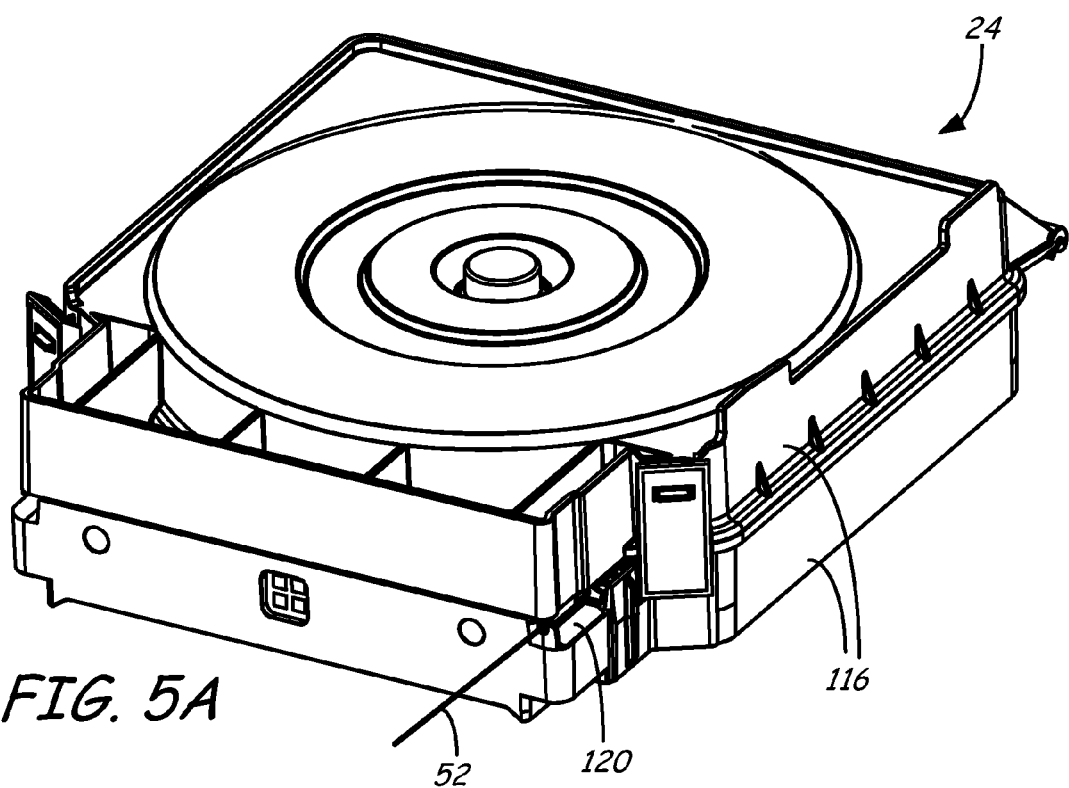
FIG. 5A is a perspective view of a first embodied consumable assembly for retaining a supply of the PGA support material in filament form.
Figure 5B:
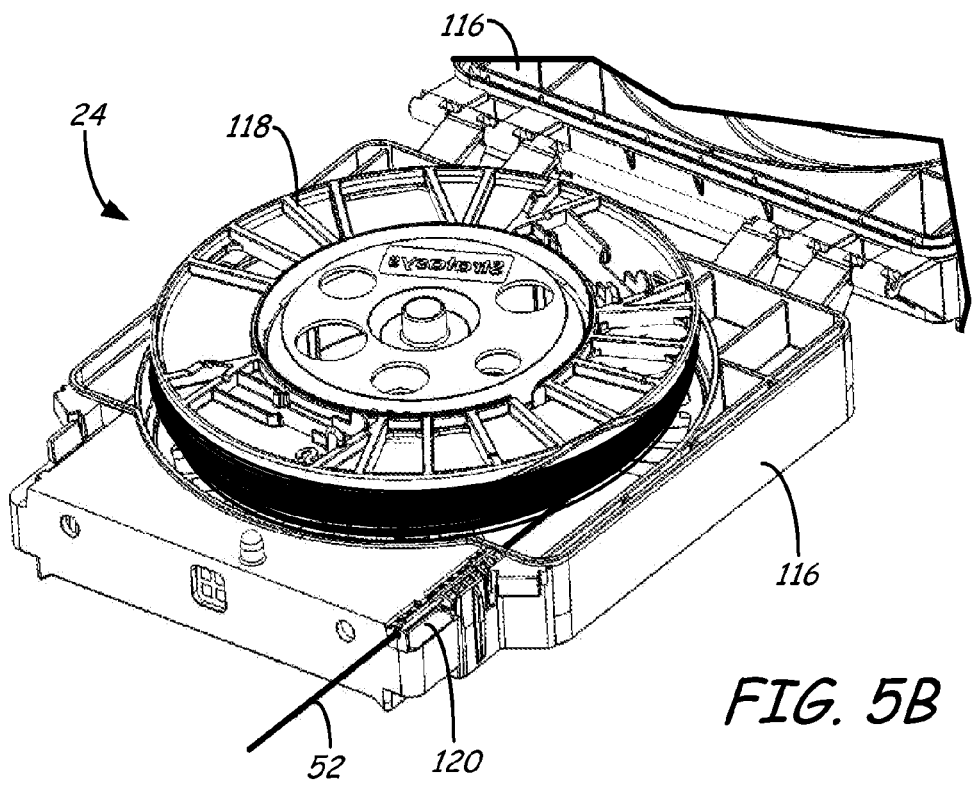
FIG. 5B is a perspective view of the first embodied consumable assembly in an open state, illustrating an interior of the first embodied consumable assembly.

FIGS. 5A-9 illustrate examples of suitable consumable assemblies for consumable assembly 24, which may retain a supply of filament 52 of the PGA support material. For example, FIGS. 5A and 5B illustrates consumable assembly 24 with a container portion 116, spool 118, and guide mechanism 120, where container portion 116 is configured to open and close in a sealing manner as shown to retain spool 118 and guide mechanism 120. Spool 118 accordingly retains a supply of filament 52 of the PGA support material, and relays filament 52 out of consumable assembly 22 via guide mechanism 120.

During use, container portion 116 may be loaded to or otherwise engaged with system 10, which aligns guide mechanism 120 with a reciprocating orifice of system 10 (not shown) to deliver filament 52 to guide tube 28. Examples of preferred devices for consumable assembly 24 in this embodiment include those disclosed in Taatjes et al, U.S. Pat. Nos. 7,938,351 and 7,938,356. Alternatively, consumable assembly 24 may have spool and cassette arrangements as disclosed in Swanson et al., U.S. Pat. No. 6,923,634 and Comb et al., U.S. Pat. No. 7,122,246.

Figure 6A:
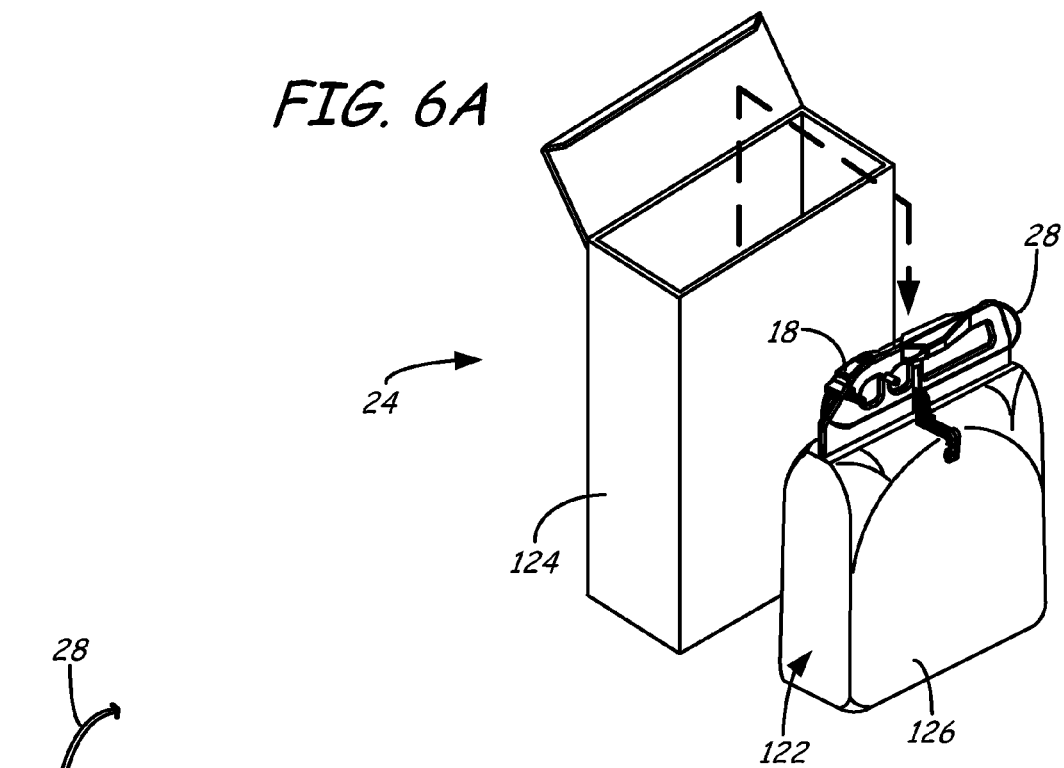
FIG. 6A is a perspective view of a second embodied consumable assembly for retaining a supply of the PGA support material in filament form.
Figure 6B:
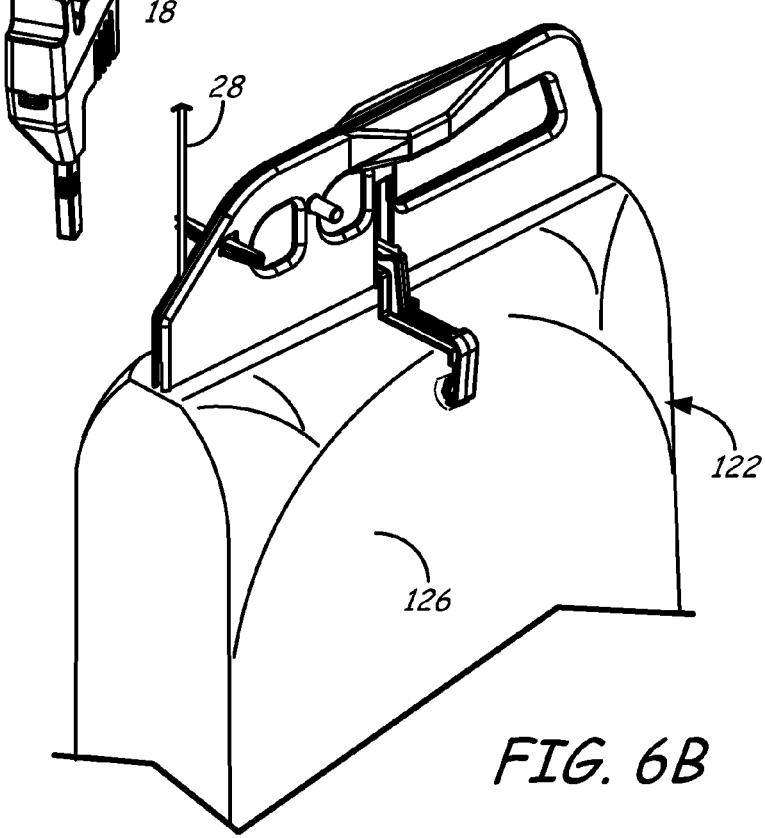
FIG. 6B is an expanded perspective view of the second embodied consumable assembly, illustrating an integrated print head and guide tube.
Figure 6C:
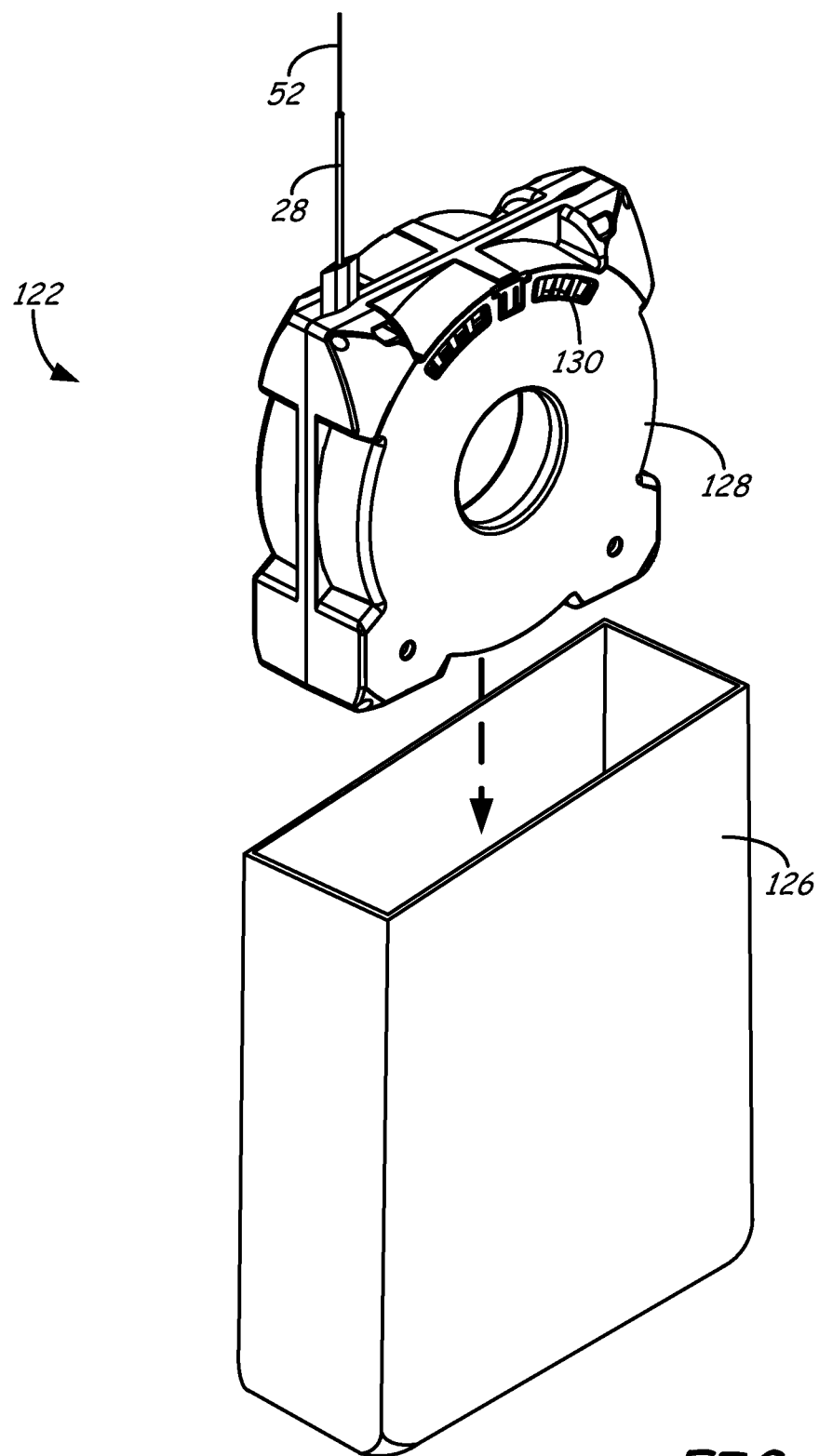
FIG. 6C is a perspective view of a container portion of the second embodied consumable assembly.

FIGS. 6A-6C illustrate an alternative embodiment for print head 18, consumable assembly 24, and guide tube 28, which are combined into a single, removable assembly, such as disclosed in Mannella et al., U.S. patent application Ser. Nos. 13/334,896 and 13/334,910. As shown in FIG. 6A, in this embodiment, consumable assembly 24 preferably includes container portion 122, which may be retained in a storage box 124, and is configured to mount print head 18 and guide tube 28.

As shown in FIG. 6B, print head 18 and guide tube 28 may be unmounted from container portion 122 and loaded to system 10 such that print head 18 is moveably retained by gantry 20, such as disclosed in Swanson, U.S. Patent Application Publication Nos. 2010/0283172 and 2012/0164256. As shown in FIG. 6C, container portion 122 may include liner 126, rigid module 128, and spool 130, where spool 130 is rotatably mounted within rigid module 128 and retains a supply of filament 52 of the PGA support material. Rigid module 128 may also be secured within liner 126, which is preferably a moisture and/or gas-barrier liner.

Figure 7:
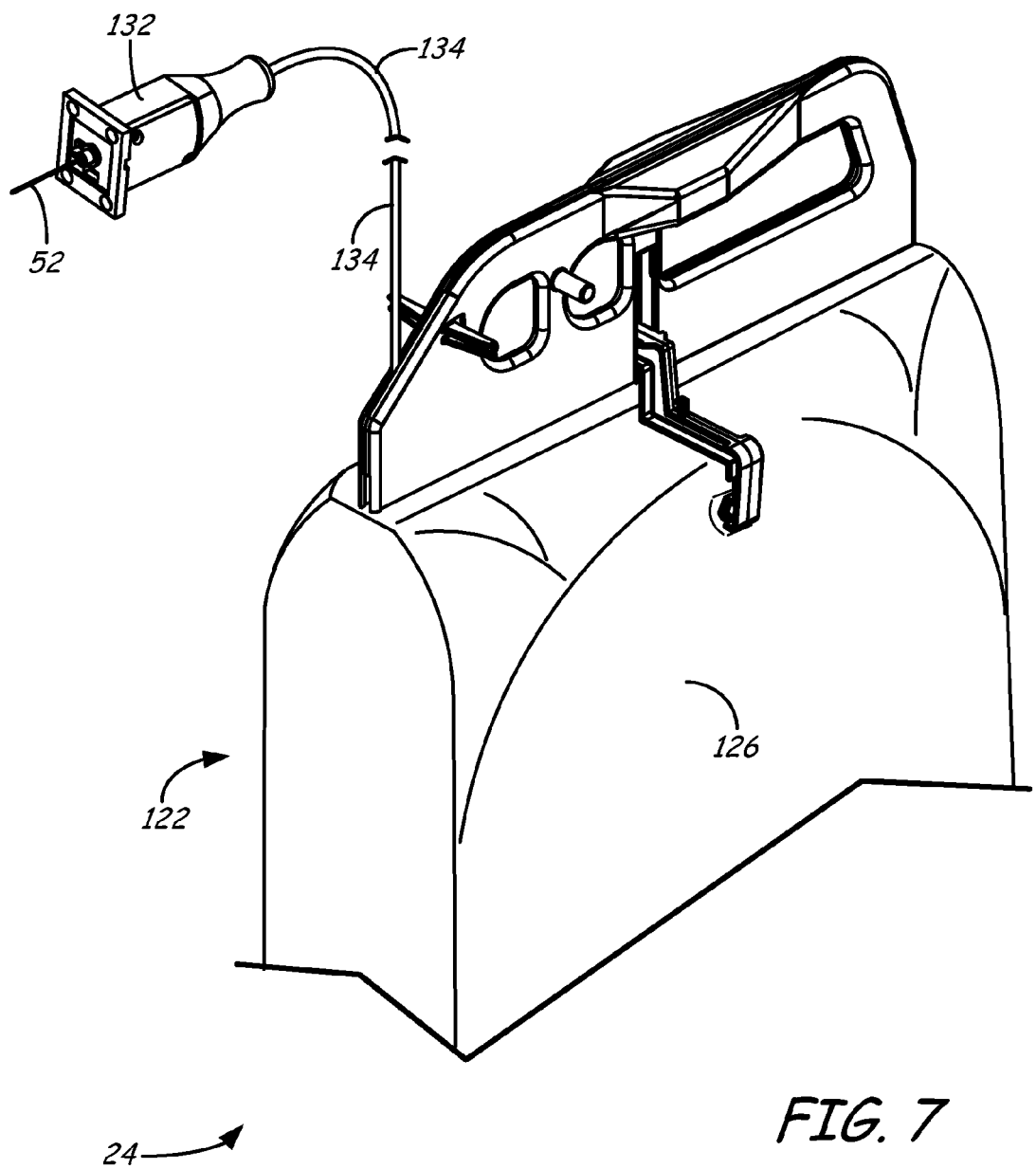
FIG. 7 is a perspective view of a portion of a third embodied consumable assembly for retaining a supply of the PGA support material in filament form, illustrating an integrated coupling adapter and guide tube.

FIG. 7 illustrates another alternative embodiment for consumable assembly 24, which is similar to the embodiment shown in FIGS. 6A-6C, but includes coupling adapter 132 and external guide tube 134, which are configured to engage an external port of system 10 (not shown) for feeding filament 52 to guide tube 28 and print head 18. Preferred devices for consumable assembly 22 in this embodiment include those disclosed in Swanson et al., U.S. patent application Ser. No. 13/334,934.

Figure 8:
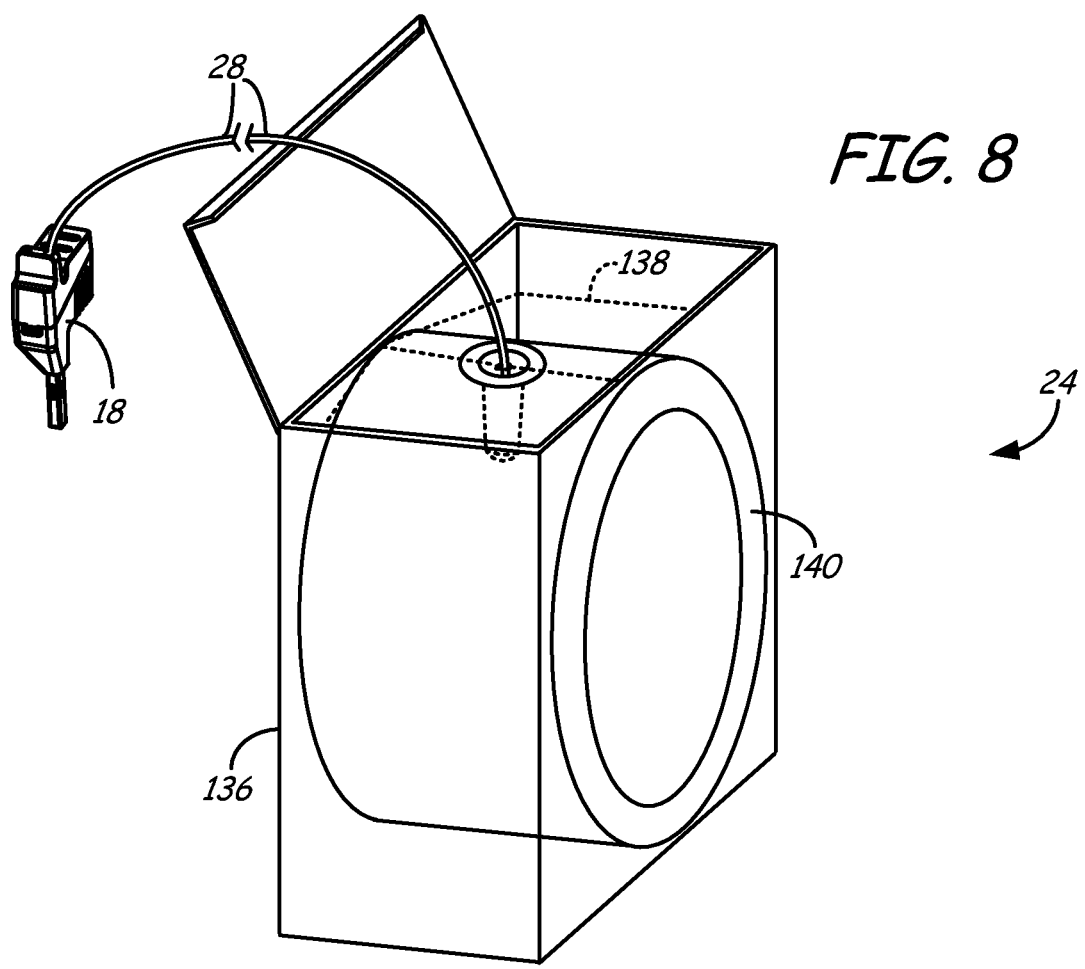
FIG. 8 is a perspective view of a fourth embodied consumable assembly for retaining a supply of the PGA support material in filament form as a coil, and including an integrated print head and guide tube.

FIG. 8 illustrates yet another alternative embodiment for consumable assembly 24, which is also similar to the embodiment shown in FIGS. 6A-6C, but includes print heat 18, guide tube 28, container portion 136, liner 138, and spool-less coil 140 of filament 52. In this embodiment, guide tube 26 may extend within liner 138 and/or coil 140 to guide successive segments of filament 52 from coil 140 to print head 18. Liner 138 is preferably a moisture and/or gas-barrier liner configured to encase coil 140. Preferred devices for consumable assembly 24 in this embodiment include those disclosed in Swanson et al., U.S. patent application Ser. No. 13/334,921.

Figure 9:
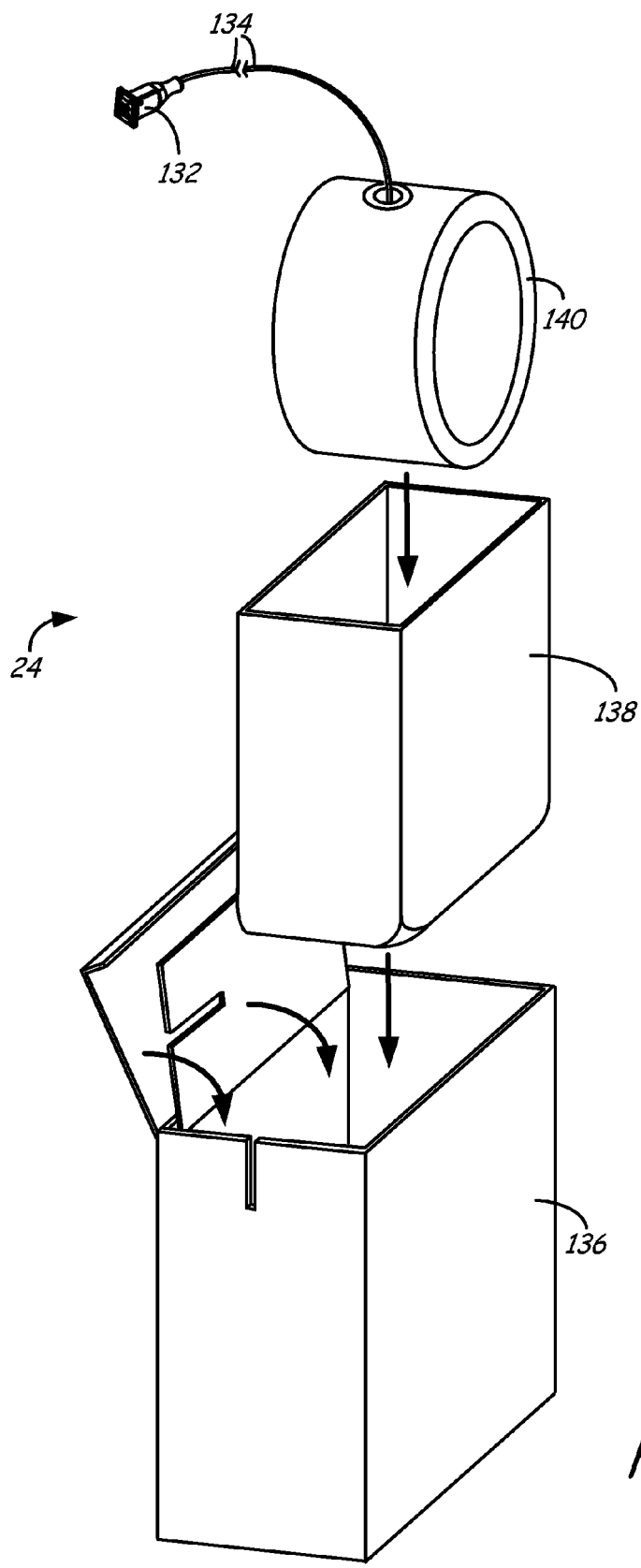
FIG. 9 is a perspective view of a portion of a fifth embodied consumable assembly, illustrating an integrated coupling adapter and guide tube, and a supply the PGA support material in filament form as a coil.

FIG. 9 illustrates another alternative embodiment for consumable assembly 24, which is a combination of the embodiments shown in FIGS. 7 and 8, and includes coupling adapter 132, external guide tube 134, container portion 136, liner 138, and coil 140 of filament 52. Preferred devices for consumable assembly 24 in this embodiment include those disclosed in Swanson et al., U.S. patent application Ser. No. 13/334,921.

In each of the above-discussed embodiments for consumable assembly 24 (e.g., as shown in FIGS. 5A-9), the retained supply of filament 52 of the PGA support material is preferably maintained in a dry state, as mentioned above. As such, consumable assembly 24 may be pre-dried and sealed to prevent moisture absorption. Additionally, consumable assembly 24 may include one or more desiccant packs to maintain a dry environment during transportation, storage, and use. In alternative embodiments, the PGA support material may be unsealed and exposed to atmospheric conditions during storage, transportation, and use with system 10.

Powder-Based Additive Manufacturing

In addition to the above-discussed extrusion-based additive manufacturing system, which preferably provides the PGA support material in filament form (e.g., filament 52), the PGA support material may alternatively be provided to an extrusion-based additive manufacturing system in powder form for use in an auger-pump print head, such as disclosed in Bosveld et al., U.S. Ser. No. 13/525,793.

In this embodiment, the PGA support material is preferably pelletized or otherwise micronized and/or classified to attain desired powder particle sizes for use in the auger-pump print head. Examples of suitable average particles sizes for the PGA support material powder range from about 15 micrometers to about 125 micrometers, and in some embodiments from about 20 micrometers to about 50 micrometers.

Moreover, the PGA support material may be provided in powder form for use in other powder-powder-based additive manufacturing systems, such as selective laser sintering systems (e.g., systems disclosed in Deckard, U.S. Pat. Nos. 4,863,538 and 5,132,143), powder/binder systems (e.g., systems disclosed in Sachs et al., U.S. Pat. No. 5,204,055), sand casting systems, electron-beam systems, and the like. Additional systems for the embodiment include those disclosed in Mannella et al., U.S. Pat. No. 8,221,858. In these embodiments, the PGA support material is also preferably pelletized or otherwise micronized and/or classified to attain desired powder particle sizes for use in the particular system.

In each of these powder-based embodiments, the PGA support material may optionally include the above-discussed additives for the filament-form PGA support material, such as colorants, fillers, plasticizers, and combinations thereof.

Electrophotography-Based Additive Manufacturing

In another embodiment, the PGA support material is configured for use in an electrophotography-based additive manufacturing system to print support structures, in association with a part material used to print 3D parts, with high resolutions and fast printing rates. Examples of suitable electrophotography-based additive manufacturing systems for this embodiment include those disclosed in Hanson et al., U.S. Publication Nos. 2013/0077996 and 2013/0077997, Comb et al., U.S. patent application Ser. Nos. 13/790,382 and 13/790,406; and Martin, U.S. patent application Ser. Nos. 13/944,472 and 13/944,478, the disclosures of which are incorporated by reference to the extent that they do not conflict with the present disclosure.

Figure 10:
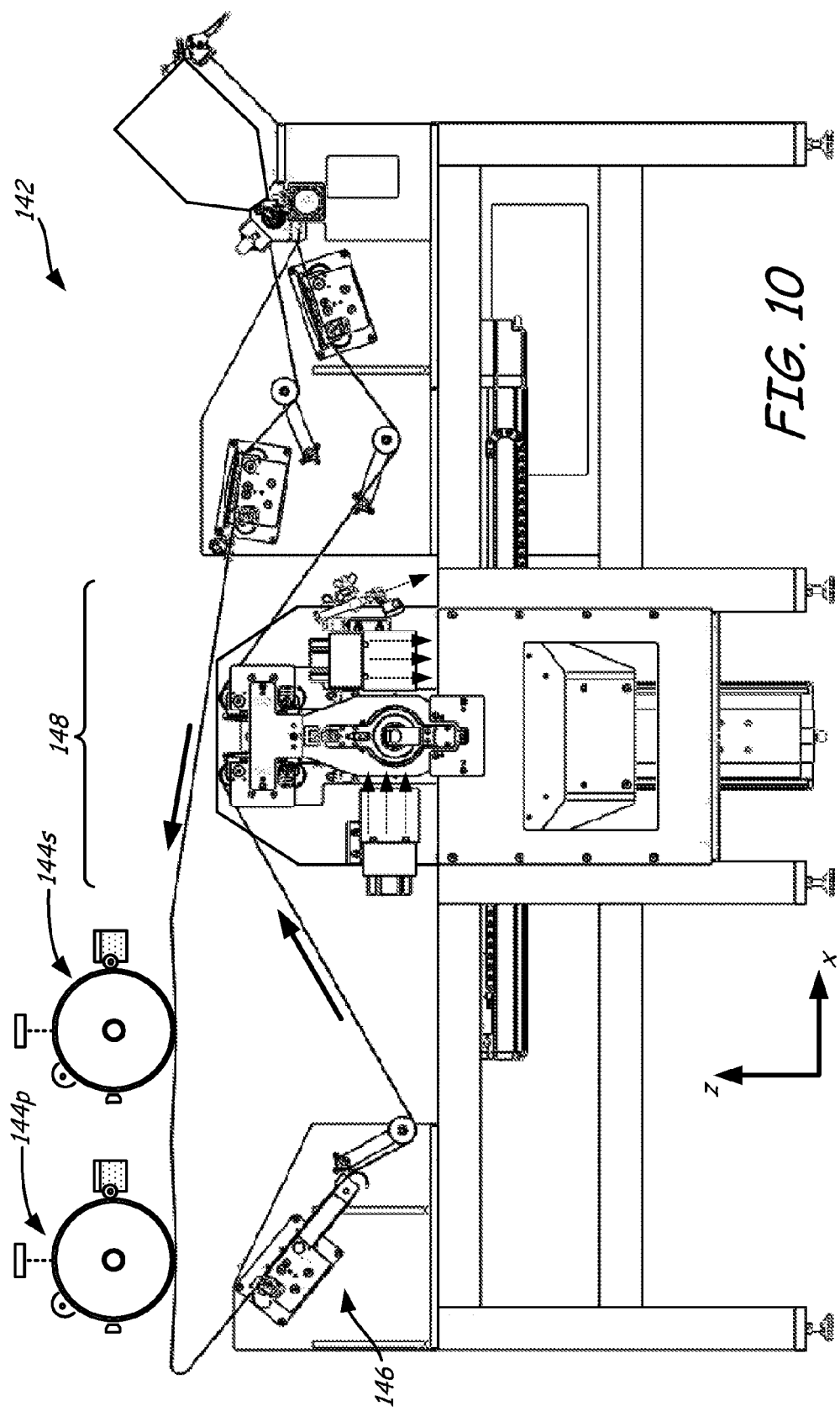
FIG. 10 is a front view of an electrophotography-based additive manufacturing system for printing 3D parts and support structures, where the support structures are printed from the PGA support material of the present disclosure.

For example, FIG. 10 illustrates system 142, which is an example electrophotography-based additive manufacturing system for printing 3D parts from a part material, and associated support structures from the PGA support material of the present disclosure. As shown in FIG. 10, system 142 includes a pair of electrophotography (EP) engines 144p and 144s, belt transfer assembly 146, and layer transfusion assembly 148.

As discussed in the above-mentioned electrophotography-based references, during a printing operation, EP engines 144p and 144s may develop or otherwise image each layer of the part and support materials using the electrophotographic process. The developed layers are then transferred via belt transfer assembly 146 to layer transfusion assembly 148 where they are transfused (e.g., using heat and/or pressure) to print one or more 3D parts and support structures in a layer-by-layer manner.

In comparison to 2D printing, in which developed toner particles can be electrostatically transferred to printing paper by placing an electrical potential through the printing paper, the multiple printed layers in a 3D environment effectively prevents the electrostatic transfer of part and support materials after a given number of layers are printed (e.g., about 15 layers). Instead, each layer may be heated to an elevated transfer temperature, and then pressed against a previously-printed layer (or to a build platform) to transfuse the layers together in a transfusion step (at layer transfusion assembly 148). This allows numerous layers of 3D parts and support structures to be built vertically, beyond what is otherwise achievable via electrostatic transfers.

Because the part material and PGA support material are preferably transfused together in a simultaneous manner, the PGA support material preferably has thermal properties (e.g., a glass transition temperature) and a melt rheology that are similar to, or more preferably, substantially the same as the thermal properties and melt rheology of its associated part material.

Accordingly, the PGA polymer (and the PGA support material itself) preferably has a glass transition temperature within about 10° C. of the glass transition temperature of the associated part material, and more preferably within about 5° C., where the glass transition temperatures are determined pursuant to the Glass Transition Temperature test described below. Furthermore, the PGA polymer (and the PGA support material itself) preferably has dynamic viscosities at 180° C., at 190° C., and at 200° C. that are each within about 10 kilopascal-seconds of the respective dynamic viscosities for the part material, more preferably within about 5 kilopascal-seconds, and even more preferably within about 2 kilopascal-seconds, where the dynamic viscosities are determined pursuant to the Melt Rheology test described below.

As mentioned above, the PGA support material is engineered for use in an electrophotography-based additive manufacturing system (e.g., system 142) to print support structures. As such, the PGA support material may also include one or more materials to assist in developing layers with EP engine 144s, to assist in transferring the developed layers from EP engine 144s to layer transfusion assembly 148, and to assist in transfusing the developed layers with layer transfusion assembly 148.

For example, in the electrophotographic process with system 142, the PGA support material is preferably charged triboelectrically through the mechanism of frictional contact charging with carrier particles at a development station of EP engine 144s. This charging of the PGA support material may be referred to by its triboelectric charge-to-mass (Q/M) ratio, which may be a positive or negative charge and has a desired magnitude. The Q/M ratio is inversely proportional to the powder density of the PGA support material, which can be referred to by its mass per unit area (M/A) value. For a given applied development field, as the value of Q/M ratio of the PGA support material is increased from a given value, the M/A value of the PGA support material decreases, and vice versa. Thus, the powder density for each developed layer of the PGA support material is a function of the Q/M ratio of the PGA support material.

It has been found that, in order to provide successful and reliable development of the PGA support material with EP engine 144s and transfer to layer transfusion assembly 148 (e.g., via belt transfer assembly 146), and to print a support structure with a good material density, the PGA support material preferably has a suitable Q/M ratio for the particular architecture of EP engine 144s and belt transfer assembly 146. Furthermore, because the part and support materials are preferably transferred together to layer transfusion assembly 148 by belt transfer assembly 146, the part and support materials preferably have similar or substantially the same Q/M ratios.

Accordingly, the PGA support material preferably has a Q/M ratio that is the same sign (i.e., negative or positive) as the Q/M ratio of the part material, and is also preferably within about 10 micro-Coulombs/gram (μC/g) of the Q/M ratio of the part material, more preferably within about 5 μC/g, and even more preferably within about 3 μC/g, where the Q/M ratios are determined pursuant to the Triboelectric Charging test described below. Examples of preferred Q/M ratios for the PGA support material range from about −5 micro-Coulombs/gram (μC/g) to about −50 μC/g, more preferably from about −10 μC/g to about −40 μC/g, and even more preferably from about −15 μC/g to about −35 μC/g, and even more preferably from about −25 μC/g to about −30 μC/g.

In this above-discussed embodiment, the Q/M ratio is based on a negative triboelectric charge. However, in an alternative embodiment, system 142 may operate such that the Q/M ratio of the PGA support material has a positive triboelectric charge with the above-discussed magnitudes. In either embodiment, these magnitudes of Q/M ratio prevent the electrostatic forces constraining the PGA support material to the carrier surfaces from being too excessive, and that any level of "wrong sign" powder is minimized. This reduces inefficiencies in the development of the PGA support material at EP engine 144s, and facilitates the development and transfer of each layer with the desired M/A value.

Furthermore, if a consistent material density of the support structure is desired, the desired Q/M ratio (and corresponding M/A value) is preferably maintained at a stable level during an entire printing operation with system 142. However, over extended printing operations with system 142, the development station of EP engine 144s may need to be replenished with additional amounts of the PGA support material. This can present an issue because, when introducing additional amounts of the PGA support material to the development station for replenishment purposes, the PGA support material is initially in an uncharged state until mixing with the carrier particles. As such, the PGA support material also preferably charges to the desired Q/M ratio at a rapid rate to maintain a continuous printing operation with system 142.

Accordingly, controlling and maintaining the Q/M ratio during initiation of the printing operation, and throughout the duration of the printing operation, will control the resultant rate and consistency of the M/A value of the PGA support material. In order to reproducibly and stably achieve the desired Q/M ratio, and hence the desired M/A value, over extended printing operations, the PGA support material preferably includes one or more charge control agents, which may be added to the PGA polymer during the manufacturing process of the PGA support material. For example, the charge control agent may be melt blended with the PGA polymer, prior to subjecting the blended materials to grinding, micronization, and/or classification.

In embodiments in which the Q/M ratio of the PGA support material has a negative charge, suitable charge control agents for use in the PGA support material include acid metal complexes (e.g., oxy carboxylic acid complexes of chromium, zinc, and aluminum), azo metal complexes (e.g., chromium azo complexes and iron azo complexes), mixtures thereof, and the like.

Alternatively, in embodiments in which the Q/M ratio of the PGA support material has a positive charge, suitable charge control agents for use in the PGA support material include azine-based compounds, and quaternary ammonium salts, mixtures thereof, and the like. These agents are effective at positively charging the PGA polymer when frictionally contact charged against appropriate carrier particles.

The charge control agents preferably constitute from about 0.1% by weight to about 5% by weight of the PGA support material, more preferably from about 0.5% by weight to about 2% by weight, and even more preferably from about 0.75% by weight to about 1.5% by weight, based on the entire weight of the PGA support material. As discussed above, these charge control agents preferably increase the charging rate of the PGA polymer against the carrier, and stabilize the Q/M ratio over extended continuous periods of printing operations with system 142.

In addition to incorporating the charge control agents, for efficient operation EP engine 144s, and to ensure fast and efficient triboelectric charging during replenishment of the support material, the mixture of the PGA support material preferably exhibits good powder flow properties. This is preferred because the PGA support material is fed into a development sump (e.g., a hopper) of the development station by auger, gravity, or other similar mechanism, where the PGA support material undergoes mixing and frictional contact charging with the carrier particles.

As can be appreciated, blockage or flow restrictions of the support material during the replenishment feeding can inhibit the supply of the PGA support material to the carrier particles. Similarly, portions of the PGA support material should not become stuck in hidden cavities in the development station. Each of these situations can alter the ratio of the PGA support material to the carrier particles, which, as discussed above, is preferably maintained at a constant level to provide the desired Q/M ratio for the charged support material.

For example, the PGA support material may constitute from about 1% by weight to about 30% by weight, based on a combined weight of the PGA support material and the carrier particles, more preferably from about 5% to about 20%, and even more preferably from about 5% to about 10%. The carrier particles accordingly constitute the remainder of the combined weight.

The powder flow properties of the PGA support material can be improved or otherwise modified with the use of one or more flow control agents, such as inorganic oxides. Examples of suitable inorganic oxides include hydrophobic fumed inorganic oxides, such as fumed silica, fumed titania, fumed alumina, mixtures thereof, and the like, where the fumed oxides may be rendered hydrophobic by silane and/or siloxane-treatment processes. Examples of commercially available inorganic oxides for use in the PGA support material include those under the tradename "AEROSIL" from Evonik Industries AG, Essen, Germany.

The flow control agents (e.g., inorganic oxides) preferably constitute from about 0.1% by weight to about 10% by weight of the PGA support material, more preferably from about 0.2% by weight to about 5% by weight, and even more preferably from about 0.3% by weight to about 1.5% by weight, based on the entire weight of the PGA support material. The flow control agents may be introduced to the PGA polymer and charge control agent at any suitable point in the manufacturing process to produce the PGA support material. For example, the blended PGA polymer may be further dry blended in a high speed and high shear cyclonic mixing apparatus, preferably at 25° C., with one or more external flow control agents. This uniformly distributes, coats, and partially embeds the flow control agent(s) into the individual particles of the blended PGA polymer, without significantly altering the particle size or particle size distribution.

As discussed above, the one or more charge control agents are suitable for charging the PGA support material copolymer to a desired Q/M ratio for developing layers of the support material at EP engine 144s, and for transferring the developed layers to layer transfusion assembly 148. However, the multiple printed layers in a 3D environment effectively prevents the electrostatic transfer of support material after a given number of layers are printed. Instead, layer transfusion assembly 148 utilizes heat and pressure to transfuse the developed layers together in the transfusion steps.

Accordingly, the PGA support material may also include one or more heat absorbers configured to increase the rate at which the PGA support material is heated when exposed to heaters of layer transfusion assembly 148. For example, in embodiments in which the heaters are infrared heaters, the heat absorber(s) used in the PGA support material may be one or more infrared (including near-infrared) wavelength absorbing materials. Absorption of infrared light causes radiationless decay of energy to occur within the particles, which generates heat in the PGA support material.

Suitable infrared absorbing materials for use in the PGA support material may vary depending on the desired color of the support material. Examples of suitable infrared absorbing materials include carbon black (which may also function as a black pigment for the support material), as well as various classes of infrared absorbing pigments and dyes, such as those that exhibit absorption in the wavelengths ranging from about 650 nanometers (nm) to about 900 nm, those that exhibit absorption in the wavelengths ranging from about 700 nm to about 1,050 nm, and those that exhibit absorption in the wavelengths ranging from about 800 nm to about 1,200 nm. Examples of these pigments and dyes classes include anthraquinone dyes, polycyanine dyes metal dithiolene dyes and pigments, tris aminium dyes, tetrakis aminium dyes, mixtures thereof, and the like.

In embodiments that incorporate heat absorbers, the heat absorbers (e.g., infrared absorbers) preferably constitute from about 0.5% by weight to about 10% by weight of the PGA support material, more preferably from about 1% by weight to about 5% by weight, and in some more preferred embodiments, from about 2% by weight to about 3% by weight, based on the entire weight of the PGA support material. The heat absorber may be introduced to the PGA polymer at any suitable point in the manufacturing process to produce the PGA support material, such as with the charge control agent. For example, the charge control agent and the heat absorber may be melt blended with the PGA polymer, prior to subjecting the blended materials to grinding, micronization, and/or classification.

In this embodiment, the PGA support material may also include one or more additional additives, such as colorants (e.g., pigments and dyes in addition to, or alternatively to, the heat absorbers), polymer stabilizers (e.g., antioxidants, light stabilizers, ultraviolet absorbers, and antiozonants), biodegradable additives, fillers, and combinations thereof. In embodiments that incorporate additional additives, the additional additives may collectively constitute from about 0.1% by weight to about 20% by weight of the support material, more preferably from about 0.2% by weight to about 10% by weight, and even more preferably from about 0.5% by weight to about 5% by weight, based on the entire weight of the PGA support material. These materials may also be introduced to the PGA polymer at any suitable point in the manufacturing process to produce the PGA support material, such as during the melt blending with the charge control agent and/or heat absorber.

For use in electrophotography-based additive manufacturing systems (e.g., system 10), the PGA support material has powder form with a controlled average particle size and a narrow particle size distribution, which are preferably similar to or substantially the same as those of the part material. The D50 particle sizes for the PGA support material are preferably within about 15 micrometers of the D50 particle size of the part material, more preferably within about 10 micrometers, and even more preferably within about 5 micrometers, where the particle sizes and particle size distributions are determined pursuant to the Particle Size and Particle Size Distribution standard described below. For example, preferred D50 particles sizes for the PGA support material include those up to about 100 micrometers if desired, more preferably from about 10 micrometers to about 30 micrometers, more preferably from about 10 micrometers to about 20 micrometers, and even more preferably from about 10 micrometers to about 15 micrometers.

Additionally, the particle size distributions for the PGA support material, as specified by the parameters D90/D50 particle size distributions and D50/D10 particle size distributions, each preferably range from about 1.00 to 1.40, more preferably from about 1.10 and to about 1.35, and even more preferably from about 1.15 to about 1.25. Moreover, the particle size distribution for the PGA support material is preferably set such that the geometric standard deviation $\sigma_g$ preferably meets the criteria pursuant to the following Equation 1:

$$\sigma g \sim \frac{D90}{D50} \sim \frac{D50}{D10}$$

In other words, the D90/D50 particle size distributions and D50/D10 particle size distributions are preferably the same value or close to the same value, such as within about 10% of each other, and more preferably within about 5% of each other.

The PGA support material may be manufactured by polymerizing or otherwise providing the PGA polymer, preferably with the modified —X—Z and/or —Y—Z extensions, melt blending the PGA polymer with the charge control agent, and optionally with the heat absorber and/or any additional additives, and then grinding, micronizing and/or classifying the resulting material to attain a powder having the above-discussed particle sizes and particle size distributions. Some additional materials, such as the flow control agent, may be blended to the resulting powder under high shear, if desired. This uniformly distributes, coats, and partially embeds the flow control agent(s) into the individual particles of the PGA support material, without significantly altering the particle size or particle size distribution.

The formulated PGA support material may then be filled into a cartridge or other suitable container for use with EP engine 144s in system 142. For example, the formulated PGA support material may be supplied in a cartridge, which may be interchangeably connected to a hopper of the development station of EP engine 144s. In this embodiment, the formulated PGA support material may be filled into the development station for mixing with the carrier particles, which may be retained in the development station. The development station may also include standard toner development cartridge components, such as a housing, delivery mechanism, communication circuit, and the like.

The carrier particles in the development station may be any suitable magnetizable carrier particles for charging the PGA support material, such as carrier particles having strontium ferrite cores with polymer coatings. The cores are typically larger in size than the particles of the PGA support material, such as averaging from about 20 micrometers to about 25 micrometers in diameter. The polymer coatings may vary depending on the Q/M ratios desired for the PGA support material. Examples of suitable polymer coatings include poly(methyl methacrylate) (PMMA) for negative charging, or poly(vinylidene fluoride) (PVDF) for positive charging. Suitable weight ratios of the PGA support material to the carrier particles in the development station or cartridge include those discussed above.

Support Structure Removal

After the printing operation is completed with any of the above-discussed additive manufacturing systems, the resulting 3D part and support structure may be removed from the system and undergo one or more post-printing operations. For example, the support structure derived from the PGA support material of the present disclosure may be sacrificially removed from the 3D part, such as by using an aqueous-based solution (e.g., an aqueous alkali solution). Under this preferred soluble technique, the support structure may at least partially dissolved in the aqueous solution, separating it from the 3D part in a hands-free manner.

In comparison, the part material is typically chemically resistant to aqueous alkali solutions. This allows the use of an aqueous alkali solution to be employed for removing the sacrificial support structure without degrading the shape or quality of the 3D part. Examples of suitable systems and techniques for removing support structure in this manner include those disclosed in Swanson et al., U.S. Pat. No. 8,459,280; Hopkins et al., U.S. Pat. No. 8,246,888; and Dunn et al., U.S. Publication No. 2011/0186081; each of which are incorporated by reference to the extent that they do not conflict with the present disclosure.

In some preferred embodiments, the dissolved support structure may also be collected from the aqueous solution and recycled or otherwise discarded in an environmentally-friendly manner. More preferably, the PGA support material (or any derivative thereof after being subjected to the aqueous solution) is separated from the aqueous solution, collected, and reformulated as fresh PGA support material for subsequent printing operations.

Property Analysis and Characterization Procedures

Various properties and characteristics of the part and support materials described herein may be evaluated by various testing procedures as described below:

1. Glass Transition Temperature

The glass transition temperature is determined using the classical ASTM method employing Differential Scanning calorimetry (DSC) ASTM D3418-12e1 and is reported in degrees Celsius. The test is performed with a DSC analyzer commercially available under the tradename "SEIKO EXSTAR 6000" from Seiko Instruments, Inc., Tokyo, Japan, with a 10-milligram sample of the support material polymer. The data is analyzed using software commercially available under the tradenames "DSC Measurement V 5.7" and "DSC Analysis V5.5", also from Seiko Instruments, Inc., Tokyo, Japan. The temperature profile for the test includes (i) 25° C. to 160° C. heating rate 10 Kelvin/minute (first heating period), (ii) 160° C. to 20° C. cooling rate 10 Kelvin/minute, and (iii) 20° C. to 260° C. heating rate 10 Kelvin/minute (second heating period). The glass transition temperature is determined using only the heat flow characteristics of the second heating period (iii).

2. Particle Size and Particle Size Distribution

Particle sizes and particle size distributions for the electrophotography-based powders are measured using a particle size analyzer commercially available under the tradename "COULTER MULTISIZER II ANALYZER" from Beckman Coulter, Inc., Brea, Calif. The particle sizes are measured on a volumetric-basis based on the D50 particles size, D10 particle size, and D90 particles size parameters.

For example, a D50 particle size of 10.0 micrometers for a sample of particles means that 50% of the particles in the sample are larger than 10.0 micrometers, and 50% of the particles in the sample are smaller than 10.0 micrometers. Similarly, a D10 particle size of 9.0 micrometers for a sample of particles means that 10% of the particles in the sample are smaller than 9.0 micrometers. Moreover, a D90 particle size of 12.0 micrometers for a sample of particles means that 90% of the particles in the sample are smaller than 12.0 micrometers.

Particle size distributions are determined based on the D90/D50 distributions and the D50/D10 distributions. For example, a D50 particle size of 10.0 micrometers, a D10 particle size of 9.0 micrometers, and a D90 particle size of 12.0 micrometers provides a D90/D50 distribution of 1.2, and a D50/D10 distribution of 1.1.

As mentioned above, the geometric standard deviation $\sigma_g$ preferably meets the criteria pursuant to the above-shown Equation 1, where the D90/D50 distributions and D50/D10 distributions are preferably the same value or close to the same value. The closeness of the D90/D50 distributions and D50/D10 distributions are determined by the ratio of the distributions. For example, a D90/D50 distribution of 1.2 and a D50/D10 distribution of 1.1 provides a ratio of 1.2/1.1=1.09, or about a 9% difference.

3. Triboelectric Charging

The triboelectric or electrostatic charging properties of powder-based materials for use in electrophotography-based additive manufacturing systems, such as system 142, may be determined with the following technique. A test sample of 7 parts by weight of the powder-based material is agitated in a clean dry glass bottle with 93 parts by weight of carrier particles. The carrier particles include a magnetized 22-micrometer core of strontium ferrite coated with 1.25% by weight of a polymer coating of poly(methyl methacrylate) (PMMA) for negative charging, or poly(vinylidene fluoride) (PVDF) for positive charging.

The mixture of the powder-based material and the carrier particles is agitated 25° C. on a jar roller for 45 minutes to ensure complete mixing of the carrier particles and the powder-based material, and to ensure equilibration of the Q/M ratios. This mixing simulates the mixing process that occurs in a development station of the electrophotography engine when the part or support materials are added to the carrier particles.

A sample of the mixture is then quantitatively analyzed with a TEC-3 Triboelectric Charge Analyzer (available from Torrey Pines Research, Fairport, N.Y.). This analyzer uses electric fields to strip the electrostatic powder from the carrier particle surface, and a rotating high-strength, planar multi-pole magnet to constrain the (magnetizable or permanently magnetized) carrier beads to a bottom electrode.

A 0.7-gram sample of the mixture (sample powder and carrier particles) is placed onto a clean stainless steel disc, which serves as the bottom electrode in an electrostatic plate-out experiment across a gap, under the influence of an applied electric field. This bottom electrode is mounted and positioned above the rotating multi-pole magnet, and a clean top plate disc electrode is mounted securely above the bottom plate, and parallel to it, so as to provide a controlled gap of 5 millimeters between the top and bottom electrode plates, using insulating polytetrafluoroethylene (PTFE under tradename "TEFLON") spacers at the electrodes' periphery.

If the powder is expected to charge negatively, a direct-current voltage of +1,500 volts is applied across the electrodes, and the magnetic stirrer is activated to rotate at 1500 rpm, so as to gently keep the carrier and powder under test constrained, but also slightly agitated on the bottom electrode, during the measurement. Alternatively, if the powder is expected to charge positively, then a negative bias voltage of −1,500 volts is applied. In either case, the applied electric field causes the powder to strip from the carrier, in the powder/carrier mixture, and to transfer to the top electrode, over a defined time period.

The stripped powder under test is deposited on the top electrode, and the induced accumulated charge on the top plate is measured using an electrometer. The amount of powder transferred to the top electrode is weighed, and compared to the theoretical percentage in the original carrier powder mix. The carrier remains on the bottom plate due to the magnetic forces constraining it.

The total charge on the top plate and the known weight of transferred electrostatic powder are used to calculate the Q/M ratio of the test powder, and to also check that all the electrostatic powder has transferred from the carrier, according to the theoretical amount originally mixed with the carrier beads. The time taken for complete powder transfer to the top plate, and the percent efficiency of the powder transfer process are also measured.

4. Powder Flowability

As discussed above, the part and support materials for use in electrophotography-based additive manufacturing systems, such as system 142, preferably exhibit good powder flow properties. This reduces or prevents blockage or flow restrictions of the part or support material during the replenishment feeding, which can otherwise inhibit the supply of the part or support material to the carrier particles in the development station. The powder flowability of a sample material is qualitatively measured by visually observing the flowability of the powder in comparison to commercially-available toners utilized in two-dimensional electrophotography processes, which are rated as having "good flow" or "very good flow".

5. Melt Rheology

For use in electrophotography-based additive manufacturing systems, such as system 142, the melt rheologies of the part and support materials are preferably substantially the same as the melt rheologies of their respective polymers, and are preferably not detrimentally affected by the other additives. Additionally, as discussed above, the part and support materials for use with electrophotography-based additive manufacturing systems preferably have similar melt rheologies.

Melt rheologies of the part and support materials, and their respective polymers, are measured based on their melt flow indices over a range of temperatures. The melt flow indices are measured using a rheometer commercially available under the tradename "SHIMADZU CFT-500D" Flowtester Capillary Rheometer from Shimadzu Corporation, Tokyo, Japan. During each test, a 2-gram sample is loaded to the rheometer pursuant to standard operation of the rheometer, and the temperature of the sample is increased to 50° C. to cause a slight compacting of the sample.

The temperature is then increased from 50° C. at a rate of 5° C. per minute, allowing the sample to first soften and then flow. The rheometer measures the sample viscosity using the flow resistance of the melt to flow through a small die orifice, as a piston of the rheometer is driven through a cylinder. The rheometer records the softening point, the temperature at which flow begins, and the rate at which flow increases as a result of the temperature increase, until the cylinder is exhausted of sample melt. The rheometer also calculates the apparent viscosity in Pascal-seconds at each temperature point in the ramp. From this data, the apparent viscosity versus temperature profile can be determined.

EXAMPLES

The present disclosure is more particularly described in the following examples that are intended as illustrations only, since numerous modifications and variations within the scope of the present disclosure will be apparent to those skilled in the art.

Example 1

An unmodified PGA polymer of Example 1, having a heat deflection temperature of about 168° C. and a melting temperature of about 220° C., was produced in cylindrical filament form having an average diameter of about 0.070 inches. The filament was then supplied to an extrusion-based additive manufacturing system commercially available from Stratasys, Inc., Eden Prairie, Minn. under the trademarks "FDM" and "FORTUS 400mc" for printing support structures in coordination with the printing of 3D parts from a polysulfone (PSU) part material having a heat deflection temperature measured at 1.8 megapascals of about 174° C. and a glass transition temperature of about 185° C.

During the printing runs, the PGA support material filament was heated in the print head at different liqeufier temperatures. It was found that suitable melting temperatures in the print head liquefier ranged from about 300° C. to about 330° C., where higher temperatures thermally degraded the support material. The PSU part material was melted at 420° C. in a second liquefier of the print head and extruded as a series of roads in coordination with the printing of the support material, with a print rate less than about $25 \times 10^{-6}$ cubic inches/second (mics). The heated chamber was maintained at about 195° C. to reduce curling and distortions of the printed 3D parts and support structures.

After each printing run was completed, the resulting 3D parts/support structures were removed from the system and placed in a support structure removal system commercially available under the tradename "WAVEWASH" from Stratasys, Inc., Eden Prairie, Minn. Each support structure effectively dissolved in the removal system solution (an aqueous alkali solution), providing the 3D parts derived from the PSU part material.

Example 2

The PGA polymer of Example 1 was also modified to incorporate a diepoxide linking groups, and PES terminal groups corresponding to the structures shown above in Formula 18. The modification reaction involved melt blending 0.5% by weight of a multi-epoxy-functional linking compound, 10% by weight of a hydroxyl-functional PES terminal compound, and the remainder by weight of the PGA polymer in a twin-screw extruder operating at 250° C. for a duration of about 30 seconds. The multi-epoxy-functional linking compound corresponded to Formula 6 shown above, which included multiple epoxy groups extending pendantly from a hydrocarbon backbone, and had a weight-average molecular weight of about 6,000.

The hydroxyl-functional PES terminal compound corresponded to Formula 15 shown above, where group $R_7$ was omitted and group $R_8$ was a chlorine atom, and which had a weight-average molecular weight ranging from about 20,000 to about 25,000. The reaction bonded the epoxy groups of the linking compound to the hydroxyl groups of the PGA polymer and the PES terminal compound to bond the linking group and the PES terminal group to one or both terminal locations of the PGA polymer as a chain extension —X—Z.

The modified PGA polymer was then produced in cylindrical filament form having an average diameter of about 0.070 inches, and was printed under the same conditions as discussed above for Example 1. In this case, the resulting support structures printed from the PGA part material exhibited good adhesion to the PSU part material of the 3D parts, resulting in strong bonds between the 3D parts and the support structures.

After each printing run was completed, the resulting 3D parts/support structures were removed from the system and placed in the support structure removal system discussed above for Example 1. Each support structure of Example 2 also effectively dissolved in the removal system solution (an aqueous alkali solution), providing the 3D parts derived from the PSU part material.

Although the present disclosure has been described with reference to preferred embodiments, workers skilled in the art will recognize that changes may be made in form and detail without departing from the spirit and scope of the disclosure.

The invention claimed is:

1. A support material for use in an additive manufacturing system, the support material comprising:
   a composition in a filament form or a powder form and comprising a polyglycolic acid polymer wherein the polyglycolic acid polymer comprises about 80% or more by weight of the composition, the polyglycolic acid polymer having at least one extension bonded to the PGA polymer, wherein the extension comprises:
   a linkage group bonded to the PGA polymer wherein the linkage group is selected from the group consisting of an epoxy group, an isocyanate group, and an anhydride group prior to bonding with the PGA polymer wherein the linkage group comprises about 0.1% by weight to about 5% by weight of the composition; and
   a terminal group bonded to the linkage group, wherein the terminal group comprises a polymer chain wherein the terminal group comprises about 1% by weight to less than about 20% by weight of the composition wherein the polymer chain of the terminal group is derived from a thermoplastic material selected from the group consisting of polyethersulfone polysulfone, polyphenylsulfone, polycarbonate, polyamide, and mixtures thereof;
   wherein the support material is configured for use in the additive manufacturing system for printing a support structure from the support material in coordination with printing of a three-dimensional part and wherein the support material has a heat deflection temperature ranging from about 150° C. to less than about 220° C.; and
   wherein the composition is at least partially soluble in an aqueous solution.

2. The support material of claim 1, wherein the linkage group is bonded to the PGA polymer at a terminal location of the PGA polymer.

3. The support material of claim 1, wherein the linkage group is bonded to a non-terminal monomer unit of the PGA polymer.

4. The support material of claim 1, wherein the composition has a heat deflection temperature ranging from about 160° C. to about 175° C.

5. The support material of claim 1, wherein the powder form has a particle size in the range of about 15 micrometers to about 125 micrometers.

6. The support material of claim 1, wherein the polyglycolic acid polymer comprises between about 85% and 95% by weight of the composition.

7. The support material of claim 1, wherein the linkage group comprises between about 0.2% and about 2.5% by weight of the composition.

8. The support material of claim 1, wherein the terminal group comprises between about 5% and about 15% by weight of the composition.

9. A support material for use in an additive manufacturing system, the support material comprising:
a composition in a filament form or a powder form and comprising a polyglycolic acid polymer filled with carbon or glass, wherein the polyglycolic acid polymer comprises about 80% or more by weight of the composition, the polyglycolic acid polymer having at least one extension bonded to the PGA polymer, wherein the extension comprises:
a linkage group bonded to the PGA polymer wherein the linkage group is selected from the group consisting of an epoxy group, an isocyanate group, and an anhydride group prior to bonding with the PGA polymer wherein the linkage group comprises about 0.1% by weight to about 5% by weight of the composition; and
a terminal group bonded to the linkage group, wherein the terminal group comprises a polymer chain wherein the terminal group comprises about 1% by weight to less than about 20% by weight of the composition;
wherein the support material is configured for use in the additive manufacturing system for printing a support structure from the support material in coordination with printing of a three-dimensional part and wherein the support material has a heat deflection temperature ranging from about 150° C. to less than about 220° C.; and
wherein the composition is at least partially soluble in an aqueous solution.

10. The support material of claim 9, wherein the linkage group is bonded to the PGA polymer at a terminal location of the PGA polymer.

11. The support material of claim 9, wherein the linkage group is bonded to a non-terminal monomer unit of the PGA polymer.

12. The support material of claim 9, wherein the polymer chain of the terminal group is derived from a thermoplastic material selected from the group consisting of polyethersulfone polysulfone, polyphenylsulfone, polycarbonate, polyamide, and mixtures thereof.

13. The support material of claim 9, wherein the composition has a heat deflection temperature ranging from about 160° C. to about 175° C.

14. The support material of claim 9, wherein the powder form has a particle size in the range of about 15 micrometers to about 125 micrometers.

15. The support material of claim 9, wherein the polyglycolic acid polymer comprises between about 85% and 95% by weight of the composition.

16. The support material of claim 9, wherein the linkage group comprises between about 0.2% and about 2.5% by weight of the composition.

17. The support material of claim 9, wherein the terminal group comprises between about 5% and about 15% by weight of the composition.

18. A method for printing a three-dimensional part with an additive manufacturing system, the method comprising:
providing a support material in filament or powder form wherein the support material has a heat deflection temperature ranging from about 150° C. to less than about 220° C. and wherein the support material comprising a polyglycolic acid (PGA) polymer wherein the polyglycolic acid polymer comprises about 80% or more by weight of the composition, wherein at least a portion of the PGA polymer has monomer units with a structure:

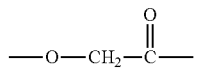

and wherein the PGA polymer further comprises a chain extension bonded to the PGA polymer, wherein the extension comprises:
a linkage group bonded to the PGA polymer wherein the linkage group is selected from the group consisting of an epoxy group, an isocyanate group and an anhydride group prior to bonding with the PGA polymer, wherein the linkage group comprises about 0.1% by weight to about 5% by weight of the composition; and
a terminal group bonded to the linkage group, wherein the terminal group comprises a polymer chain wherein the terminal group comprises about 1% by weight to less than about 20% by weight of the composition wherein the polymer chain of the terminal group is derived from a thermoplastic material selected from the group consisting of polyethersulfone polysulfone, polyphenylsulfone, polycarbonate, polyamide, and mixtures thereof;
providing a part material;
printing layers of a support structure from the provided support material;
printing layers of the three-dimensional part from the provided part material in coordination with the printing of the layers of the support structure, wherein at least a portion the printed layers of the support structure support the printed layers of the three-dimensional part; and
dissolving at least a portion of the support structure from the three-dimensional part with an aqueous solution.

19. The method of claim 18, wherein the support material has a heat deflection temperature ranging from about 160° C. to about 175° C.

20. The method of claim 18, wherein the part material comprises a thermoplastic polymer selected from the group consisting of polyethersulfone polysulfone, polyphenylsulfone, polyetherimide, and mixtures thereof.

21. The method of claim 18, wherein printing the layers of a support structure comprises:
feeding the support material to a print head;
melting the fed support material in the print head; and
extruding the molten support material from the print head.

22. The method of claim 18, wherein printing the layers of a support structure comprises:

developing the layers with an electrophotography engine;

transferring the developed layers to a layer transfusion assembly; and transfusing the transferred layers to previously-transfused layers.

23. The method of claim 18, wherein the PGA polymer further comprises the chain extension bonded to a terminal location of the PGA polymer.

24. The method of claim 18, wherein the terminal group comprises a polymer chain derived from a terminal compound that is substantially miscible with the part material.

25. The method of claim 18, wherein the PGA polymer further comprises a branched extension grafted to a non-terminal monomer unit of the PGA polymer.

* * * * *